(12) United States Patent
Ushijima-Mwesigwa et al.

(10) Patent No.: US 12,287,211 B2
(45) Date of Patent: Apr. 29, 2025

(54) VEHICLE ROUTING PROBLEM (VRP) SOLUTION USING ANNEALER-BASED SOLVERS

(71) Applicant: FUJITSU LIMITED, Kawasaki (JP)

(72) Inventors: Hayato Ushijima-Mwesigwa, San Jose, CA (US); Pouya Shati, Toronto (CA); Indradeep Ghosh, Cupertino, CA (US)

(73) Assignee: FUJITSU LIMITED, Kawasaki (JP)

( * ) Notice: Subject to any disclaimer, the term of this patent is extended or adjusted under 35 U.S.C. 154(b) by 271 days.

(21) Appl. No.: 17/931,246

(22) Filed: Sep. 12, 2022

(65) Prior Publication Data

US 2024/0085194 A1   Mar. 14, 2024

(51) Int. Cl.
*G01C 21/34* (2006.01)
*G01C 21/36* (2006.01)
*G06N 5/01* (2023.01)

(52) U.S. Cl.
CPC ....... *G01C 21/343* (2013.01); *G01C 21/3453* (2013.01); *G01C 21/3676* (2013.01); *G06N 5/01* (2023.01)

(58) Field of Classification Search
CPC .............. G01C 21/343; G01C 21/3453; G01C 21/3676; G06N 5/01
See application file for complete search history.

(56) References Cited

U.S. PATENT DOCUMENTS

2020/0401650 A1   12/2020   Chen et al.
2023/0177415 A1*   6/2023   Kumar ............... G06N 10/60

OTHER PUBLICATIONS

Extended European Search Report dated Jan. 31, 2024 for corresponding European Patent Application No. 23190242.0, 8 pages.

* cited by examiner

*Primary Examiner* — Michael D Lang
(74) *Attorney, Agent, or Firm* — Fujitsu Intellectual Property Center

(57) ABSTRACT

In an embodiment, a set of parameters associated with a vehicle routing problem is received. A set of decision variables and a set of constraints associated with an optimization problem are received. An optimization problem is constructed. The optimization problem is divided into a set of sub-problems. Each of the set of sub-problems corresponds to a subset of warehouses of a set of warehouses. An intermediate solution is determined for each of the set of sub-problems to determine a set of routes associated with the corresponding sub-problem of the set of sub-problems. The intermediate solution associated with each of the set of sub-problems is combined to determine a final solution of the optimization problem based on the received set of constraints. The determined final solution is indicative of the set of optimal routes to be assigned to the set of vehicles. The final solution is rendered on a display device.

20 Claims, 10 Drawing Sheets

VEHICLE ROUTING PROBLEM (VRP) SOLUTION USING ANNEALER-BASED SOLVERS

FIELD

The embodiments discussed in the present disclosure are related to solution of a vehicle routing problem (VRP) using quantum-annealing machines, hereinafter also referred to as annealer-based solvers.

BACKGROUND

Advancements in the field of operational research have led to optimization of various industrial processes, such as, production lines, raw material transportation, product distribution, supply-chain related processes, and the like. With the growing complexity of the industrial processes, the optimization of such processes has become a non-trivial task. For example, each industrial process may have several constraints, which may have to be satisfied together during the optimization of the process. An example of an optimization problem of an industrial process is a vehicle routing problem. The goal of the vehicle routing problem is to determine optimal routes for a set of vehicles to distribute items between a depot and a set of warehouses. Traditional methods for optimization of the industrial processes may require significant time and computing resources. Further, results determined by the traditional methods may be sub-optimal solutions, which when implemented for the industrial processes, may result in loss in revenue, wastage of time, and requirement of additional man-hours of effort. Thus, there is a need for efficient techniques for optimization of the industrial processes.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include a set of operations, which may include receiving a set of parameters associated with a vehicle routing problem. The vehicle routing problem may be an optimization problem whose goal may be to determine a set of optimal routes, between a depot and a set of warehouses, for a delivery of a set of items using a set of vehicles. Further, a total cost associated with the set of optimal routes may correspond to a minimum cost associated with a set of possible routes between the depot and the set of warehouses. The set of operations may further include receiving a set of decision variables associated with the optimization problem. The set of operations may further include receiving a set of constraints associated with the optimization problem based on the received set of parameters and the received set of decision variables. The set of operations may further include constructing the optimization problem based on the received set of constraints. The set of operations may further include dividing the constructed optimization problem into a set of sub-problems. Each of the set of sub-problems may correspond to a subset of warehouses of the set of warehouses. The set of operations may further include determining, using an annealer-based solver, an intermediate solution for each of the set of sub-problems to determine a set of routes associated with the corresponding sub-problem of the set of sub-problems. The set of operations may further include combining the intermediate solution associated with each of the set of sub-problems to determine a final solution of the optimization problem based on the received set of constraints. The determined final solution may be indicative of the set of optimal routes to be assigned to the set of vehicles. The set of operations may further include rendering the determined final solution of the optimization problem on a display device.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

Figure 1:
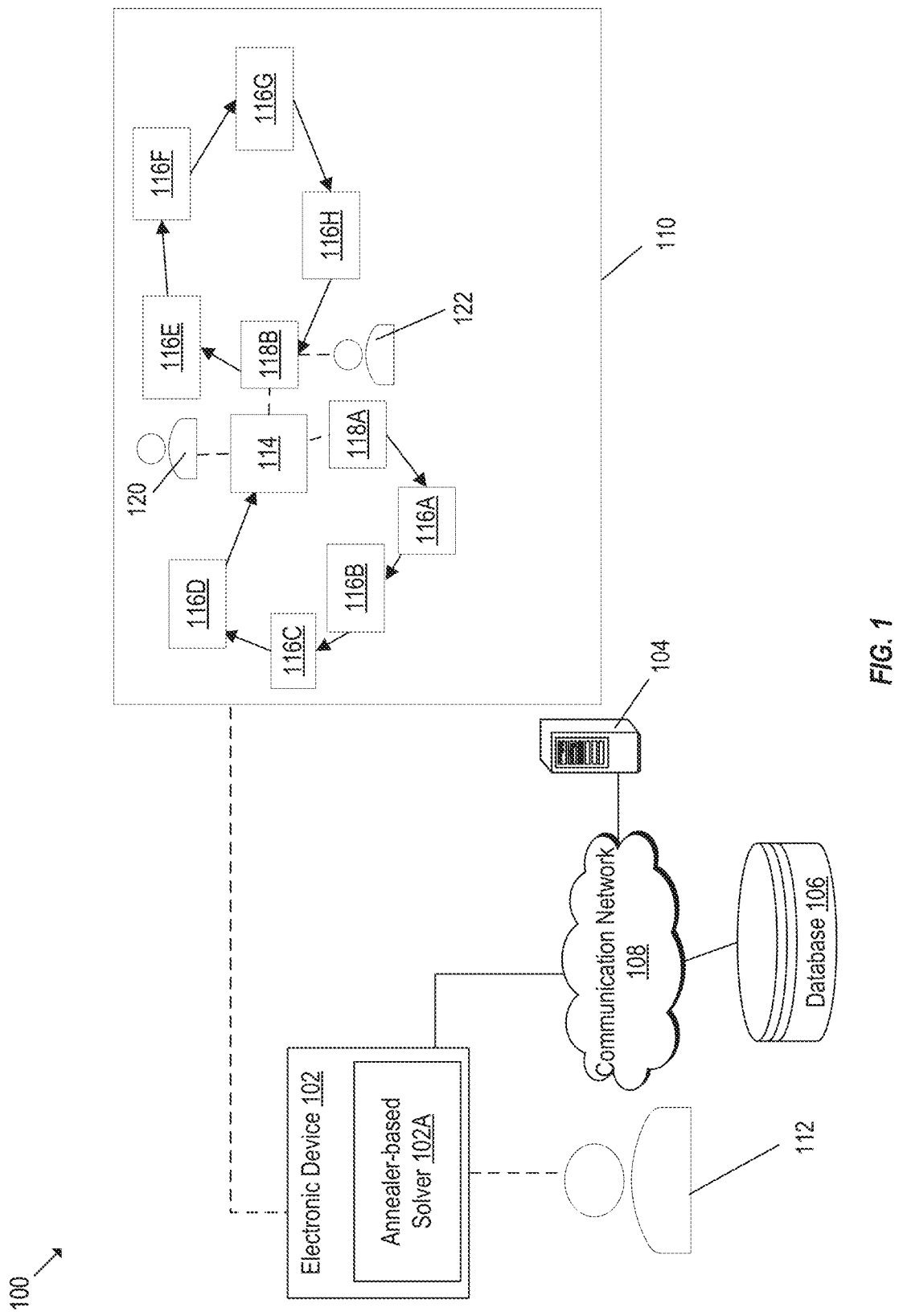
FIG. 1 is a diagram representing an example environment related to a solution of a vehicle routing problem (VRP) using annealer-based solvers.

all according to at least one embodiment described in the present disclosure.

DESCRIPTION OF EMBODIMENTS

Some embodiments described in the present disclosure relate to methods and systems for determination of a set of optimal routes associated with a vehicle routing problem. Herein, the vehicle routing problem may be an optimization problem whose goal may be to determine a set of optimal routes, between a depot and a set of warehouses, for a delivery of a set of items using a set of vehicles. Further, a total cost associated with the set of optimal routes may correspond to a minimum cost associated with a set of possible routes between the depot and the set of warehouses. In the present disclosure, a set of parameters associated with the vehicle routing problem may be received. Further, a set of decision variables associated with the optimization problem may be received. Thereafter, a set of constraints associated with the optimization problem based on the received set of parameters and the received set of decision variables may be received. Further, the optimization problem may be constructed based on the received set of constraints. The constructed optimization problem may be divided into a set of sub-problems. Each of the set of sub-problems may correspond to a subset of warehouses of the set of warehouses. Further, an intermediate solution may be determined for each of the set of sub-problems, using an annealer-based solver, to determine a set of routes associated with the corresponding sub-problem of the set of sub-problems. Thereafter, the intermediate solution associated with each of the set of sub-problems may be combined to determine a final solution of the optimization problem based on the received set of constraints. Herein, the determined final solution may be indicative of the set of optimal routes to be assigned to the set of vehicles. For example, the set of optimal routes may correspond to routes whose total cost (e.g., total time required to cover the routes, total distance associated with the routes, etc.) subject to the satisfaction of the set of constraints of the VRP is minimum. Finally, the determined final solution of the optimization problem may be rendered on a display device.

According to one or more embodiments of the present disclosure, the technological field of operational research may be improved by configuring a computing system in a manner that the computing system may be able to determine the set of routes associated to the vehicle routing problem (VRP). The computing system may receive the set of parameters associated with the vehicle routing problem and the set of decision variables associated with the optimization problem. Thereafter, the computing system may receive the set of constraints associated with the optimization problem based on the received set of parameters and the received set of decision variables. Next, the computing system may construct the optimization problem based on the received set of constraints. Further, the computing system may divide the constructed optimization problem into the set of sub-problems. Each of the set of sub-problems may correspond to the subset of warehouses of the set of warehouses. Thereafter, the computing system may determine the intermediate solution for each of the set of sub-problems, using the annealer-based solver, to determine the set of routes associated with the corresponding sub-problem of the set of sub-problems. Further, the computing system may combine the intermediate solution associated with each of the set of sub-problems to determine the final solution of the optimization problem, based on the received set of constraints. Herein, the determined final solution may be indicative of the set of optimal routes to be assigned to the set of vehicles. For example, the set of optimal routes may correspond to routes whose total cost (e.g., total time required to cover the routes, total distance associated with the routes, etc.) subject to the satisfaction of the set of constraints of the VRP is minimum. Finally, the computing system may render the determined final solution of the optimization problem on the display device.

Freight transportation may be a critical part of any supply chain. The vehicle routing problem (VRP) may be a challenging optimization problem with many important applications in various industries, such as industries which involve transportation of raw materials, components, and finished goods between a depot and multiple warehouses. The goal of the vehicle routing problem may be to determine optimal routes for a set of vehicles to distribute items between the depot and the set of warehouses. Many real-world VRP instances may include multiple complex constraints that may make such problems non-trivial to solve. Special-purpose hardware, such as, quantum computers or quantum-inspired solvers may be useful to solve such optimization problems. However, current VRP instances may be too large and complex to solve based on state-of-the art or near-term hardware. Traditional methods may require significant time and computational resources to optimize the industrial processes. Further, the results determined by the traditional methods may be sub-optimal solutions, which when implemented for the industrial processes, may result in loss in revenue, wastage of time, and requirement of additional man-hours of effort.

The disclosed electronic device, on the other hand, may solve complex VRP optimization problems using multiple annealer-based solvers based on a decomposition of the VRP optimization problem into sub-problems, a determination of solutions to the sub-problems, and a combination of the individual solutions of the sub-problems to determine a final solution to the VRP optimization problem. The combination of the individual solutions of the sub-problems may be subject to the constraints of the VRP optimization problems to ensure that the final solution satisfies the constraint and may be an optimum solution. Herein, the determined final solution may be indicative of the set of optimal routes to be assigned to the set of vehicles. As the optimization problem may be divided into the sub-problems, which may be assigned to different annealer-based solvers, the VRP optimization problems may be solved in a lesser amount of time, due to parallelization of the problem. Also, as the individual sub-problems may be much less complex than the overall VRP optimization problem, multiple inexpensive annealer-based solvers (such as, digital annealers) may be used to solve each such sub-problem. Further, as the final solution of the VRP optimization problem may be optimal, the implementation of such solution may help to increase an efficiency and revenue associated with the underlying industrial process of distribution of items between the depot and the set of warehouses using the set of vehicles.

Embodiments of the present disclosure are explained with reference to the accompanying drawings.

FIG. 1 is a diagram representing an example environment related to a solution of a vehicle routing problem (VRP) using annealer-based solvers, according to at least one embodiment described in the present disclosure. With reference to FIG. 1, there is shown an environment 100. The environment 100 may include an electronic device 102, a server 104, a database 106, a communication network 108, and a vehicle routing environment 110. The electronic device 102, the server 104, and a device hosting the database 106 may be communicatively coupled to one another, via the communication network 108. The electronic device 102 may include an annealer-based solver 102A. In FIG. 1, there is further shown a user 112, who may be associated with or operate the electronic device 102. The vehicle routing environment 110 may include a depot 114, a set of warehouses 116A to 116H, and a set of vehicles 118A and 118B. An operator 120 may be associated with the depot 114. A driver 122 may be associated with the vehicle 118B. The set of warehouses 116A to 116H, the set of vehicles 118A and 118B shown in FIG. 1 is presented merely as an example and may include more vehicles or warehouses, without departure from the scope of the disclosure.

The electronic device 102 may include suitable logic, circuitry, and interfaces that may be configured to solve an optimization problem, such as, the vehicle routing problem (VRP) using the annealer-based solver 102A based on a set of parameters, a set of decision variables, and a set of constraints. The electronic device 102 may be further configured to determine a set of optimal routes, between the depot 114 and the set of warehouses 116A to 116H, for a delivery of a set of items using the set of vehicles 118A and 118B. Examples of the electronic device 102 may include, but are not limited to, a computing device, a hardware-based annealer device, a digital-annealer device, a quantum-based or quantum-inspired annealer device, a smartphone, a cellular phone, a mobile phone, a gaming device, a mainframe machine, a server, a computer workstation, and/or a consumer electronic (CE) device.

The annealer-based solver 102A may be special purpose hardware, for example, quantum or quantum-inspired hardware that may be useful to solve optimization problems. In one or more embodiments of the disclosure, the annealer-based solver 102A may be implemented as a generalized quantum computing device. In such an implementation, the generalized quantum computing device may use specialized optimization solving software applications (e.g., a Quadratic Unconstrained Binary Optimization (QUBO) or using a solver) at an application layer to implement searching algorithms or meta-heuristic algorithms, such as simulated annealing or quantum annealing, to search for a solution to the optimization problem (such as, the VRP) from a discrete solution space.

The generalized quantum computing device may be different from a digital bit-based computing device, such as digital devices that are based on transistor-based digital circuits. The generalized quantum computing device may include one or more quantum gates that use quantum bits (hereinafter referred to as "qubits") to perform computations for different information processing applications, such as quantum annealing computations for solving combinatorial optimization problems. In general, a qubit can represent "0", "1", or a superposition of both "0" and "1". In most cases, the generalized quantum computing device may need a carefully controlled cryogenic environment to function properly. The generalized quantum computing device uses certain properties found in quantum mechanical systems, such as quantum fluctuations, quantum superposition of its Eigen-states, quantum tunneling, and quantum entanglement. These properties may help the generalized quantum computing device to perform computations for solving certain mathematical problems (e.g., QUBO functions) which are computationally intractable by conventional computing devices. Examples of the generalized quantum computing device may include, but are not limited to, a silicon-based nuclear spin quantum computer, a trapped ion quantum computer, a cavity quantum-electrodynamics (QED) computer, a quantum computer based on nuclear spins, a quantum computer based on electron spins in quantum dots, a superconducting quantum computer that uses superconducting loops and Josephson junctions, and nuclear magnetic resonance quantum computer.

In some other embodiments, the annealer-based solver 102A may be a quantum annealing computer that may be specifically designed and hardware/software optimized to implement searching algorithms or meta-heuristic algorithms, such as simulated annealing or quantum annealing. Similar to the generalized quantum computing device, the quantum annealing computer may also use qubits and may require a carefully controlled cryogenic environment to function properly.

In some other embodiments, the annealer-based solver 102A may correspond to a digital quantum-computing processor for solving user-end combinatorial optimization problems, which may be submitted in the form of a QUBO formulation. More specifically, the annealer-based solver 102A may be a digital annealer that may be based on a semiconductor-based architecture. The digital annealer may be designed to model the functionality of the quantum annealing computer on a digital circuitry. The digital annealer may operate at room temperature and may not require cryogenic environment to function. Also, the digital annealer may have a specific form factor that may allow it to fit on a circuit board that may be small enough to slide into the rack of a computing device or a computing infrastructure, such as a data center.

In some other embodiments, the annealer-based solver 102A may include a processor to execute software instructions associated with one or more searching algorithms and/or meta-heuristic algorithms, such as simulated annealing or quantum annealing. Examples of the implementation of the processor may include, but are not limited to, a Reduced Instruction Set Computing (RISC) processor, an Application-Specific Integrated Circuit (ASIC) processor, a Complex Instruction Set Computing (CISC) processor, a Graphical Processing Unit (GPU), a Co-processor, and/or a combination thereof.

The server 104 may include suitable logic, circuitry, and interfaces, and/or code that may be configured to construct an optimization problem based on the set of constraints. The server 104 may be further configured to divide the constructed optimization problem into a set of sub-problems and determine an intermediate solution for each of the set of sub-problems to determine a set of routes associated with the corresponding sub-problem of the set of sub-problems. The server 104 may be further configured to combine the intermediate solution associated with each of the set of sub-problems to determine a final solution of the optimization problem based on the set of constraints. The server 104 may be implemented as a cloud server and may execute operations through web applications, cloud applications, HTTP requests, repository operations, file transfer, and the like. Other example implementations of the server 104 may include, but are not limited to, a database server, a file server, a web server, a media server, an application server, a mainframe server, or a cloud computing server.

In at least one embodiment, the server 104 may be implemented as a plurality of distributed cloud-based resources by use of several technologies that may be well known to those ordinarily skilled in the art. A person with ordinary skill in the art will understand that the scope of the disclosure may not be limited to the implementation of the server 104 and the electronic device 102 as two separate entities. In certain embodiments, the functionalities of the server 104 can be incorporated in its entirety or at least partially in the electronic device 102, without a departure from the scope of the disclosure.

The database 106 may include suitable logic, interfaces, and/or code that may be configured to store the set of parameters, information about the set of warehouses 116A to 116H, information about the set of vehicles 118A and 118B, the set of decision variables, and the set of constraints. The database 106 may be derived from data off a relational or non-relational database, or a set of comma-separated values (csv) files in conventional or big-data storage. The database 106 may be stored or cached on a device, such as a server or the electronic device 102. The device storing the database 106 may be configured to receive a query for the set of parameters, the set of warehouses 116A to 116H, the set of vehicles 118A and 118B, the set of decision variables, and/or the set of constraints from the electronic device 102. In response, the device of the database 106 may be configured to retrieve and provide the queried the set of parameters, the information about the set of warehouses 116A to 116H, the information about the set of vehicles 118A and 118B, the set of decision variables, and/or the set of constraints to the electronic device 102 based on the received query. In some embodiments, the database 106 may be hosted on a plurality of servers stored at same or different locations. The operations of the database 106 may be executed using hardware including a processor, a microprocessor (e.g., to perform or control performance of one or more operations), a field-programmable gate array (FPGA), or an application-specific integrated circuit (ASIC). In some other instances, the database 106 may be implemented using software.

The communication network 108 may include a communication medium through which the electronic device 102, the server 104, the device hosting the database 106, and devices related to the set of warehouses 116A to 116H and the set of vehicles 118A and 118B may communicate with each other. The communication network 108 may be one of a wired connection or a wireless connection. Examples of the communication network 108 may include, but are not limited to, the Internet, a cloud network, Cellular or Wireless Mobile Network (such as Long-Term Evolution and 5G New Radio), a Wireless Fidelity (Wi-Fi) network, a Personal Area Network (PAN), a Local Area Network (LAN), or a Metropolitan Area Network (MAN). Various devices in the environment 100 may be configured to connect to the communication network 108 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

Each of the set of vehicles 118A and 118B may be a non-autonomous vehicle, a semi-autonomous vehicle, or a fully autonomous vehicle, for example, as defined by National Highway Traffic Safety Administration (NHTSA). Examples of the set of vehicles 118A and 118B may include, but are not limited to, a two-wheeler vehicle, a three-wheeler vehicle, a four-wheeler vehicle, a hybrid vehicle, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. The set of vehicles 118A and 118B may be a system through which a rider (e.g., the driver 122) may travel from a start point to a destination point. Examples of the two-wheeler vehicle may include, but are not limited to, an electric two-wheeler, an internal combustion engine (ICE)-based two-wheeler, or a hybrid two-wheeler. Similarly, examples of the four-wheeler vehicle may include, but are not limited to, an electric car, an internal combustion engine (ICE)-based car, a fuel-cell based car, a solar powered-car, or a hybrid car. The set of vehicles 118A and 118B may also include heavy road vehicles such as, a truck, a lorry, and the like for transporting goods between the set of warehouses 116A to 116H and the depot 114. The present disclosure may be also applicable to other types of two-wheelers (e.g., a scooter) or four-wheelers. The description of other types of the vehicle has been omitted from the disclosure for the sake of brevity.

It may be appreciated that the vehicle routing problem (VRP) problem may be the problem of assignment of routes to a set delivery trucks. Most VRP variants deal with a minimization of the total cost of delivery. Different VRP variants may have different constraints. Common constraints may include, but are not limited to, a certain capacity of trucks, a demand of customers, or a fixed time-window during which deliveries may be made. The electronic device 102 may solve the VRP, as described herein.

The electronic device 102 may receive a set of parameters associated with the vehicle routing problem. Herein, the vehicle routing problem may be an optimization problem whose goal may be to determine a set of optimal routes, between a depot (such as, the depot 114) and a set of warehouses (such as, the set of warehouses 116A to 116H), for a delivery of a set of items using a set of vehicles (such as, the set of vehicles 118A and 118B). The total cost associated with the set of optimal routes may correspond to a minimum cost associated with a set of possible routes between the depot 114 and the set of warehouses 116A to 116H. The vehicle routing problem may be similar to a travelling salesman problem, wherein for a given set of cities with known distances, one or more shortest routes may be determined so that the salesman may travel from a starting city to each city of the given set of cities only once and finally return to the starting city. The determination of the one or more shortest route may enable the salesman to save time and travel expenses. Similar to the travel salesman problem, the vehicle routing problem may solve the optimization problem to determine the set of optimal routes such that the set of vehicles 118A and 118B may transport the set of items to the set of warehouses 116A to 116H within a stipulated time at a minimum cost. It may be appreciated that the optimization problem may help to determine a best solution (i.e., the set of optimal routes) from a set of possible solutions (i.e., the set of possible routes). Thus, the best solution for the vehicle routing problem may be the set of optimal routes, which may be the shortest possible routes such that each warehouse may be visited once, and each vehicle may return to the starting warehouse (i.e., the depot 114) at the end. In this way, a travel expense and time of the set of vehicles 118A and 118B may be saved. The set of optimal routes between the set of warehouses 116A to 116H and the depot 114 may be determined based on the set of parameters. Examples of the set of parameters, may include, but are not limited to, a number of vehicles, a preparation time associated with a vehicle type, or a travel time between a first location and a second location. Details of the set of parameters are further provided, for example, in FIG. 3.

The electronic device 102 may receive a set of decision variables associated with the optimization problem. The set of decision variables may correspond to variables whose values may be updated during the solution of the optimization problem to indicate a certain aspect related to a solution space of the optimization problem. The set of decision variables may have binary or non-binary values. A decision variable that may have binary values may be "1" when the decision variable is true and "0" when the decision variable is false. Examples of the set of decision variables may include a binary variable indicative of whether a vehicle type with a predefined operation time is assigned to a route, or a time taken to travel from a first location to a second location in a route. Details of the set of decision variable are further provided, for example, in FIG. 3.

The electronic device 102 may receive a set of constraints associated with the optimization problem based on the received set of parameters and the received set of decision variables. The set of constraints may be one or more limitations on which the optimization problem may be bounded. For example, in an embodiment, for each route, only one vehicle type and only one vehicle operation may be assigned. As an example, for a first route, the vehicle 118A may be assigned with an unloading operation. Herein, the vehicle 118A may unload one or more items from the set of items at the warehouses that the vehicle 118A visits. The set of constraints may ensure that the one or more items may be delivered by the set of vehicles (e.g., the set of vehicles 118A and 118B) only from the depot 114 to each warehouse or from each warehouse to the depot 114 and may be never delivered between warehouses. The set of constraints may further ensure that all trips may start from the depot 114 may go around only warehouses and return to the depot 114. In single trip, the set of vehicles 118A and 118B may visit the same warehouse up to a specified number of times. It may be possible to go to the same warehouse in multiple trips. In each trip, it may be possible to perform loading and unloading of the items at once in the warehouses that may be visited only once. In each trip, the set of vehicles 118A and 118B may only unload for a first time and only load for a second time in the warehouses in which the corresponding vehicles go twice. There may be multiple kinds of items to be delivered. There may be different vehicle types with different load capacities. In certain cases, the number of vehicles may be unlimited. A table including a maximum loading capacity of one item against other items to be loaded for each vehicle type may be given as an input. Some vehicle types may only visit specific warehouses. Further, a specified number of products may be required to be delivered from the depot 114 to each warehouse and there may be also a specified number of products that may be required to be delivered from the warehouses to the depot 114. Unloading in each warehouse may be completed by a final unloading time. All vehicles may go to warehouses for loading after a start-time for loading. In each warehouse, the final loading by the last vehicle may be performed after a last-trip load wait time. Each vehicle type may be associated with an operation time. Total cost of a delivery plan may be the sum of the cost for each trip. Details of the set of constraints are further provided, for example, in FIG. 3.

In an embodiment, the set of constraints may be received as user inputs from the user 112 associated with the electronic device 102. For example, the electronic device 102 may present a user interface to the user 112 to receive the set of constraints. The user interface may enable the user 112 to define constraints associated with the optimization problem of the VRP, based on an entry of the set of constraints as the user input. In another embodiment, the set of constraints may be fixed and may be automatically retrieved, for example, from the database 106.

The electronic device 102 may construct an optimization problem based on the received set of constraints. The optimization problem may be a function of the set of constraints, and the goal of the optimization problem may be to determine the set of optimal routes for the vehicle routing problem. A variation of one or more constraints in the set of constraints may result in a construction of a new vehicle routing problem. Hence, depending on the received set of constraints, the electronic device 102 may construct the vehicle routing problem.

The electronic device 102 may divide the constructed optimization problem into a set of sub-problems, where each of the set of sub-problems may correspond to a subset of warehouses of the set of warehouses (e.g., the set of warehouses 116A to 116H). It may be appreciated that the vehicle routing problem may be quite computationally complex due to a large number of warehouses, constraints, decision variables, and parameters. Hence, complex hardware may be required to solve the VRP optimization problem. Also, due to the complexity of the VRP optimization problem, it may take a large computational time to obtain a solution that may provide a satisfactory result. In order to mitigate the aforesaid problems associated with the VRP, the disclosed electronic device 102 may divide the VRP optimization problem into the set of sub-problems. Herein, each sub-problem may correspond to the subset of warehouses. For example, if the set of warehouses comprise 100 warehouses, then the VRP optimization problem may be divided into 10 sub-problems where each sub-problem may include 10 warehouses. The division of the VRP optimization problem into the set of sub-problems may reduce the complexity involved in the determination of a solution of the VRP optimization problem. Complexity of each sub-problem may be lesser than the original VRP optimization problem and hence, solving of each sub-problem of the set of sub-problems may not need complex hardware and may also require a much lesser computational time.

The electronic device 102 may determine, using the annealer-based solver 102A, an intermediate solution for each of the set of sub-problems to determine a set of routes associated with the corresponding sub-problem of the set of sub-problems. As discussed, the VRP optimization problem may be divided into the set of sub-problems to reduce the complexity. Each sub-problem may be solved using the annealer-based solver 102A to determine the intermediate solution for the corresponding sub-problem. The intermediate solution for the corresponding sub-problem may include the set of routes by which the set of vehicles 118A and 118B may transport the set of items to the corresponding subset of warehouses at a minimum cost. Each sub-problem of the set of sub-problems may be solved either serially using a single annealer-based solver, such as, the annealer-based solver 102A or in parallel using multiple annealer-based solvers, such as, the annealer-based solver 102A. In order to solve each sub-problem serially, the set of sub-problems may be arranged in a queue and may be provided to the annealer-based solver 102A in a serial order. To solve the set of sub-problems in parallel, the set of sub-problems may be fed to the multiple annealer-based solvers at once. Though, solving parallelly may require a greater number of annealer-based solvers, however, a computation time taken to solve the set of sub-problems may be reduced significantly. It may be noted that the intermediate solution associated with each of the set of sub-problems may be a partial solution and not a complete solution of the VRP optimization problem.

The electronic device 102 may further combine the intermediate solution associated with each of the set of sub-problems to determine the final solution of the optimization problem based on the received set of constraints. Herein, the determined final solution may be indicative of the set of optimal routes to be assigned to the set of vehicles (e.g., the set of vehicles 118A and 118B). As the final solution may be obtained based on a combination of the intermediate solution associated with each of the set of sub-problems, the final solution may be regarded as a complete solution of the VRP optimization problem. The final solution may indicate the set of optimal routes such that the set of vehicles 118A and 118B may transport the set of items to or from the set of warehouses 116A to 116H and the depot 114 at a minimum cost. Thus, the set of optimal routes may include shortest possible routes that the set of vehicles 118A and 118B may take. For example, if the set of sub-problems include a first sub-problem, a second sub-problem, and a third sub-problem, the intermediate solution of each sub-problem may be combined in order to obtain the final solution.

Figure 2:
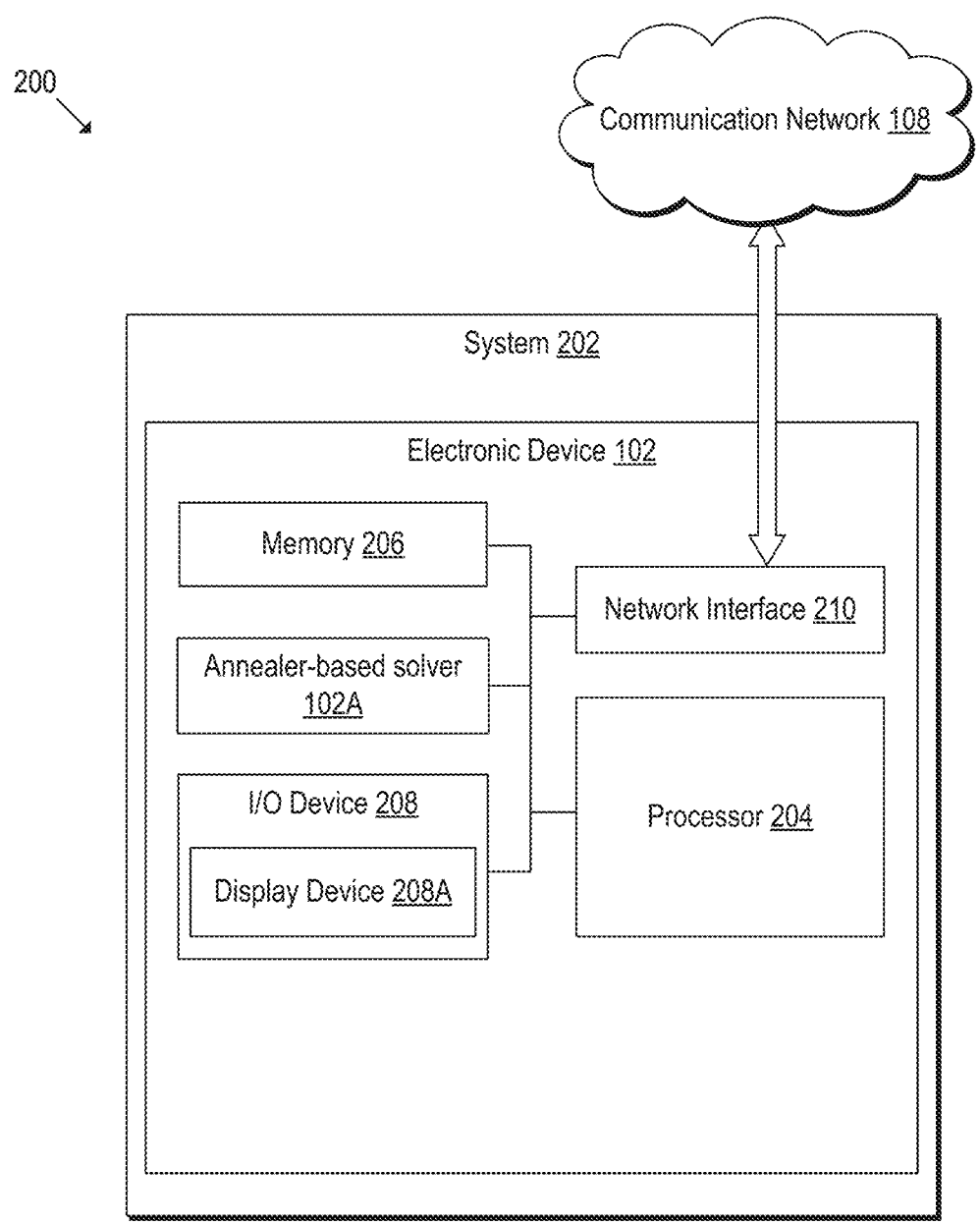
FIG. 2 is a block diagram that illustrates an exemplary electronic device for a solution of a vehicle routing problem (VRP) using annealer-based solvers.

The electronic device 102 may render the determined final solution of the optimization problem on a display device (such as a display device 208A of FIG. 2). The determined final solution may be presented on the display device so that the user 112, and/or the operator 120, and/or the driver 122 associated with the electronic device 102, the depot 114 and the vehicle 118B, respectively, may view the set of optimal routes. The operator 120 or the user 112 may then instruct the driver 122 of the vehicle 118B to take the set of optimal routes in order to transport the set of items between the depot 114 and the set of warehouses 116A to 116H. In an embodiment, the final solution may guide the driver 122 to take the set of optimal routes. For example, the display device may provide a guidance such as, a map to guide the driver 122 to follow the set of optimal routes.

The electronic device 102 may determine the set of optimal routes in a lesser amount of time, due to the division of the optimization problem into the set of sub-problems and the determination of the parallel partial solutions of the divided set of sub-problems. Also, inexpensive solvers, such as, annealer-based solvers (e.g., digital annealers) may be used to solve each such sub-problem. The final solution, so obtained, may be optimal. As the solution may be optimal, the implementation of such solution may help to increase the efficiency and revenue associated with the underlying industrial process of distribution of the set of items between the depot 114 and the set of warehouses 116A to 116H using the set of vehicles 118A and 118B.

Modifications, additions, or omissions may be made to FIG. 1 without departing from the scope of the present disclosure. For example, the environment 100 may include more or fewer elements than those illustrated and described in the present disclosure. For instance, in some embodiments, the environment 100 may include the electronic device 102 but not the database 106. In addition, in some embodiments, the functionality of each of the database 106 and the server 104 may be incorporated into the electronic device 102, without a deviation from the scope of the disclosure.

FIG. 2 is a block diagram that illustrates an exemplary electronic device for a solution of a vehicle routing problem (VRP) using annealer-based solvers, in accordance with at least one embodiment described in the present disclosure. FIG. 2 is explained in conjunction with elements from FIG. 1. With reference to FIG. 2, there is shown a block diagram 200 of a system 202 including the electronic device 102. The electronic device 102 may include a processor 204, a memory 206, the annealer-based solver 102A, an input/output (I/O) device 208 (including a display device 208A), and a network interface 210.

The processor 204 may include suitable logic, circuitry, and interfaces that may be configured to execute a set of instructions stored in the memory 206. The processor 204 may be configured to execute program instructions associated with different operations to be executed by the electronic device 102. For example, some of the operations may include receiving the set of parameters, the set of decision variables, and the set of constraints. The processor 204 may be configured to construct the optimization problem and divide the constructed optimization problem into the set of sub-problems. The processor 204 may be further configured to determine the intermediate solution for each of the set of sub-problems to determine the set of routes associated with the corresponding sub-problem of the set of sub-problems. The processor 204 may be further configured to combine the intermediate solution associated with each of the set of sub-problems to determine the final solution of the optimization problem based on the received set of constraints. The processor 204 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), a co-processor, or a combination thereof.

Although illustrated as a single processor in FIG. 2, the processor 204 may include any number of processors configured to, individually or collectively, perform or direct performance of any number of operations of the electronic device 102, as described in the present disclosure. Additionally, one or more of the processors may be present on one or more different electronic devices, such as different servers. In some embodiments, the processor 204 may be configured to interpret and/or execute program instructions and/or process data stored in the memory 206. After the program instructions are loaded into the memory 206, the processor 204 may execute the program instructions.

The memory 206 may include suitable logic, circuitry, and interfaces that may be configured to store the one or more instructions to be executed by the processor 204. The one or more instructions stored in the memory 206 may be executed by the processor 204 to perform the different operations of the processor 204 (and the electronic device 102). The memory 206 that may be configured to store the set of parameters, the set of decision variables, the set of constraints, information related to the set of warehouses 116A to 116H and the set of vehicles 118A and 118B. The memory 206 may be further configured to store information associated with the constructed optimization VRP, the sub-problems, and the partial solutions (i.e., the intermediate solutions) of the set of sub-problems. Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 208 may include suitable logic, circuitry, and interfaces that may be configured to receive an input from the user 112 and provide an output based on the received input. For example, the I/O device 208 may receive the set of parameters, the set of decision variables, and the set of constraints as a user input from the user 112. Further, the I/O device 208 may render the set of optimal routes corresponding to the final solution of the VRP optimization problem as an output for the user 112. The I/O device 208 which may include various input and output devices, may be configured to communicate with the processor 204. Examples of the I/O device 208 may include, but are not limited to, a touch screen, a keyboard, a mouse, a joystick, a microphone, a display device (e.g., the display device 208A), and a speaker The display device 208A may include suitable logic, circuitry, and interfaces that may be configured to display the final solution of the VRP optimization problem. The display device 208A may be a touch screen which may enable a user to provide a user-input via the display device 208A. The touch screen may be at least one of a resistive touch screen, a capacitive touch screen, or a thermal touch screen. The display device 208A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 208A may refer to a display screen of a head mounted device (HMD), a smart-glass device, a see-through display, a projection-based display, an electro-chromic display, or a transparent display.

The network interface 210 may include suitable logic, circuitry, and interfaces that may be configured to facilitate communication between the processor 204, the server 104, and a device hosting the database 106 (and/or any other device in the environment 100), via the communication network 108. The network interface 210 may be implemented by use of various known technologies to support wired or wireless communication of the electronic device 102 with the communication network 108. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 210 may be configured to communicate via wireless communication with networks, such as the Internet, an Intranet, or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

Modifications, additions, or omissions may be made to the example electronic device 102 without departing from the scope of the present disclosure. For example, in some embodiments, the example electronic device 102 may include any number of other components that may not be explicitly illustrated or described for the sake of brevity.

Figure 3:
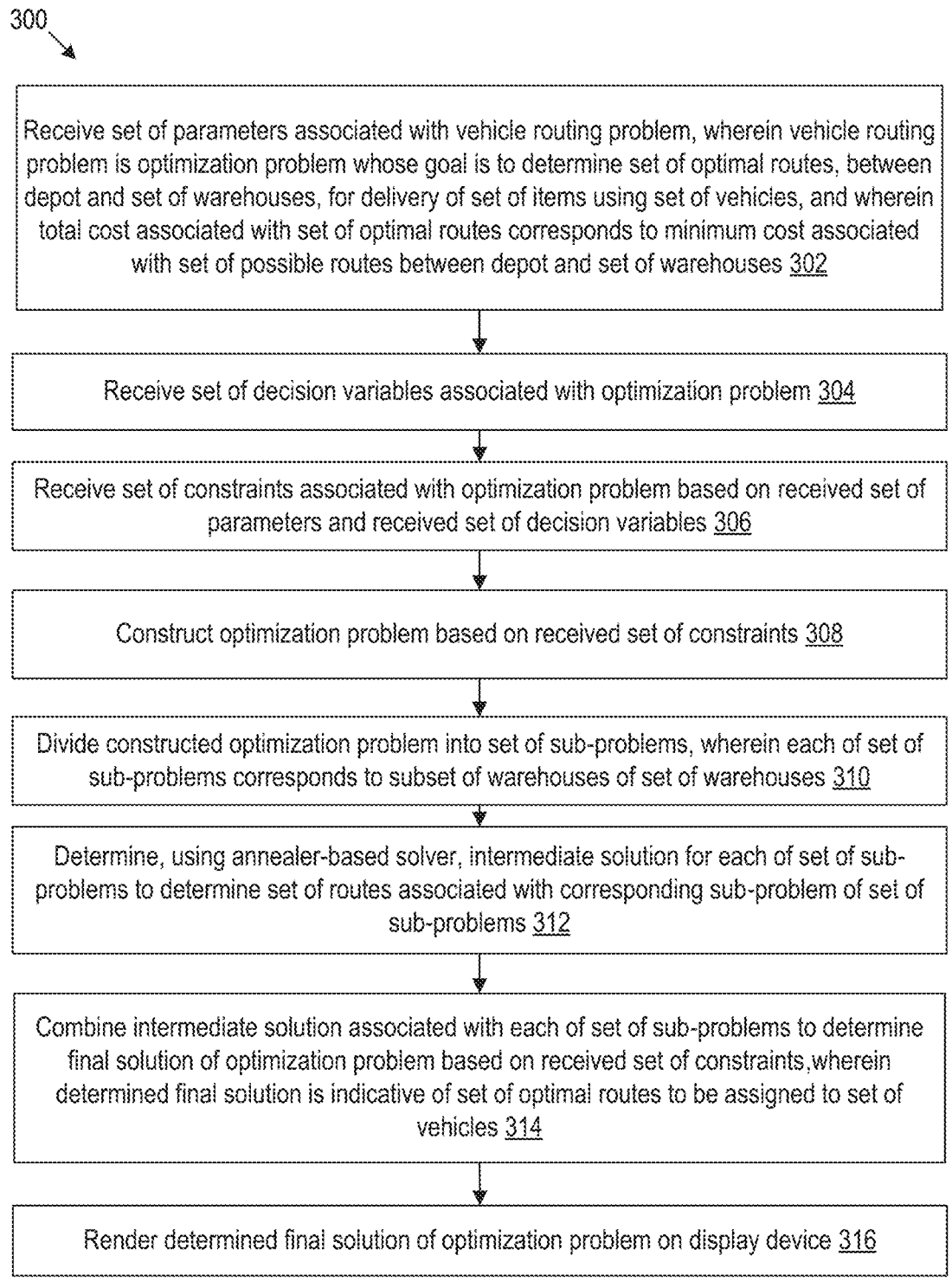
FIG. 3 is a diagram that illustrates a flowchart of an example method for a solution of a vehicle routing problem (VRP) using annealer-based solvers.

FIG. 3 is a diagram that illustrates a flowchart of an example method for a solution of a vehicle routing problem (VRP) using annealer-based solvers, in accordance with an embodiment of the disclosure. FIG. 3 is described in conjunction with elements from FIG. 1, and FIG. 2. With reference to FIG. 3, there is shown a flowchart 300. The method illustrated in the flowchart 300 may start at 302 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 300 may be divided into additional blocks, combined into fewer blocks, or eliminated, depending on the particular implementation.

At block 302, the set of parameters associated with the vehicle routing problem (VRP) may be received. Herein, the vehicle routing problem may be the optimization problem whose goal may be to determine the set of optimal routes, between the depot 114 and the set of warehouses 116A to 116H, for the delivery of the set of items using the set of vehicles 118A and 118B. Further, the total cost associated with the set of optimal routes corresponds to the minimum cost associated with the set of possible routes between the depot 114 and the set of warehouses 116A to 116H. In an embodiment, the processor 204 may be configured to receive the set of parameters associated with the vehicle routing problem. As discussed, the vehicle routing problem may be similar to the travelling salesman problem. The vehicle routing problem may correspond to the optimization problem for a determination of the set of optimal routes such that the set of vehicles 118A and 118B may transport the set of items between the depot 114 and the set of warehouses 116A to 116H within a stipulated time at the minimum cost. It may be appreciated that the optimization problem may help to determine best solutions from the set of possible solutions. The best solutions for the vehicle routing problem may be the set of optimal routes. Herein, the set of optimal routes may be shortest possible routes such that each warehouse may be visited once, and each vehicle may return to the starting warehouse (i.e., the depot 114) at the end. In this way, a travel expense and a time required by the set of vehicles 118A and 118B may be saved. The set of optimal routes between the set of warehouses 116A to 116H and the depot 114 may be determined based on the set of parameters. Details of the set of parameters are further provided, for example, in FIG. 5A.

At block 304, the set of decision variables associated with the optimization problem may be received. In an embodiment, the processor 204 may be configured to receive the set of decision variables associated with the optimization problem. The set of decision variables may correspond to variables whose values may be updated during the solution of the optimization problem to indicate a certain aspect related to a solution space of the optimization problem. The set of decision variables may have binary or non-binary values. A decision variable may consider binary values as "1" when the decision variable is true and "0" when the decision variable is false. Examples of the set of decision variables may include the binary variable indicative of whether the vehicle type with the predefined operation time may be assigned to the route, the time taken to travel from the first location to a second location in the route, and the like. Details of the set of decision variable are further provided, for example, in FIG. 5A.

At block 306, the set of constraints associated with the optimization problem may be received based on the received set of parameters and the received set of decision variables. In an embodiment, the processor 204 may be configured to receive the set of constraints associated with the optimization problem based on the received set of parameters and the received set of decision variables. The set of constraints may be one or more limitations on which the optimization problem may be bound. For example, in an embodiment, for each route, only one vehicle type and only one action type may be assigned. In an embodiment, the set of constraints may be received as user inputs from the user 112 associated with the electronic device 102. In another embodiment, the set of constraints may be fixed and may be automatically retrieved, for example, from the database 106. Details of the set of constraints are further provided, for example, in FIG. 5A.

At block 308, the optimization problem may be constructed based on the received set of constraints. In an embodiment, the processor 204 may be configured to construct the optimization problem based on the received set of constraints. As discussed, the optimization problem may be a function of the set of constraints, and the goal of the optimization problem is to determine the set of optimal routes for the vehicle routing problem. A variation in the set of constraints may result in the construction of the new vehicle routing problem. Hence, depending on the received set of constraints, the optimization problem may be constructed. Details related to the construction of the optimization problem are provided, for example, in FIG. 5A.

At block 310, the constructed optimization problem may be divided into the set of sub-problems. Each of the set of sub-problems may correspond to the subset of warehouses of the set of warehouses 116A to 116H. In an embodiment, the processor 204 may be configured to divide the constructed optimization problem into the set of sub-problems. As discussed, the vehicle routing problem may be quite computationally complex due to a large number of warehouses, constraints, decision variables, and parameters. Hence, complex hardware may be required to solve the VRP optimization problem. Moreover, due to the complexity of the vehicle routing problem, a large computational time may be required to obtain a solution of the VRP optimization problem that provides a satisfactory result. In order to mitigate aforesaid problems associated with the VRP, the VRP optimization problem may be divided into the set of sub-problems. Herein, each sub-problem may correspond to the subset of warehouses. For example, if the set of warehouses comprise 100 warehouses, then the VRP optimization problem may be divided into 10 sub-problems where each sub-problem may include 10 warehouses. The division of the VRP optimization problem into the set of sub-problems may help to handle the complexity of the VRP. Complexity of each sub-problem may be lesser than the original VRP optimization problem and hence, solving of each sub-problem of the set of sub-problems may not need complex hardware.

At block 312, the intermediate solution for each of the set of sub-problems may be determined using the annealer-based solver 102A to determine the set of routes associated with the corresponding sub-problem of the set of sub-problems. In an embodiment, the processor 204 may be configured to determine the intermediate solution for each of the set of sub-problems, using the annealer-based solver 102A to further determine the set of routes associated with the corresponding sub-problem of the set of sub-problems. As discussed, the VRP optimization problem may be divided into the set of sub-problems to reduce the complexity. Further, each sub-problem may be solved using the annealer-based solver 102A to determine the intermediate solution for the corresponding sub-problem. The intermediate solution for the corresponding sub-problem may include the set of routes by which the set of vehicles 118A and 118B may transport the set of items to the corresponding subset of warehouses at a minimum cost. Each sub-problem of the set of sub-problems may be solved either serially using a single annealer-based solver (e.g., the annealer-based solver 102A) or in parallel using multiple annealer-based solvers (such as, the annealer-based solver 102A). In order to solve each sub-problem serially, the set of sub-problems may be arranged in the queue and may be provided to the annealer-based solver 102A in a serial order. To solve the set of sub-problems in parallel, the set of sub-problems may be fed to the multiple annealer-based solvers at once. Though, solving parallelly may require a greater number of annealer-based solvers, however, a computation time taken to solve the set of sub-problems may be reduced significantly. It may be noted that the intermediate solution associated with each of the set of sub-problems may be a partial solution and not a complete solution of the VRP optimization problem.

At block 314, the intermediate solution associated with each of the set of sub-problems may be combined to determine the final solution of the optimization problem based on the received set of constraints. In an embodiment, the processor 204 may be configured to combine the intermediate solution associated with each of the set of sub-problems to determine the final solution of the optimization problem based on the received set of constraints. Herein, the determined final solution may be indicative of the set of optimal routes to be assigned to the set of vehicles 118A and 118B. As the final solution may be obtained by combination of the intermediate solution associated with each of the set of sub-problems, the final solution may be regarded as a complete solution of the VRP optimization problem. The final solution may indicate the set of optimal routes such that the set of vehicles 118A and 118B may transport the set of items to or from the set of warehouses 116A to 116H and the depot 114 at a minimum cost. Thus, the set of optimal routes may include shortest possible routes that the set of vehicles 118A and 118B may take. For example, if the set of sub-problems include a first sub-problem, a second sub-problem, and a third sub-problem, the intermediate solution of each sub-problem may be combined in order to obtain the final solution.

At block 316, the determined final solution of the optimization problem may be rendered on the display device 208A. In an embodiment, the processor 204 may be configured to render the determined final solution of the optimization problem on the display device 208A. The determined final solution may be presented on the display device 208A so that the user 112, and/or the operator 120, and/or the driver 122 associated with the electronic device 102, the depot 114 and the vehicle 118B, respectively, may view the set of optimal routes. The operator 120 or the user 112 may then instruct the driver 122 of the vehicle 118B to take the set of optimal routes in order to transport the set of items between the depot 114 and the set of warehouses 116A to 116H. In an embodiment, the final solution may guide the driver 122 to follow the set of optimal routes.

Although the flowchart 300 is illustrated as discrete operations, such as 302, 304, 306, 308, 310, 312, 314, and 316. However, in certain embodiments, such discrete operations may be further divided into additional operations, combined into fewer operations, or eliminated, depending on the particular implementation without detracting from the essence of the disclosed embodiments.

Figure 4:
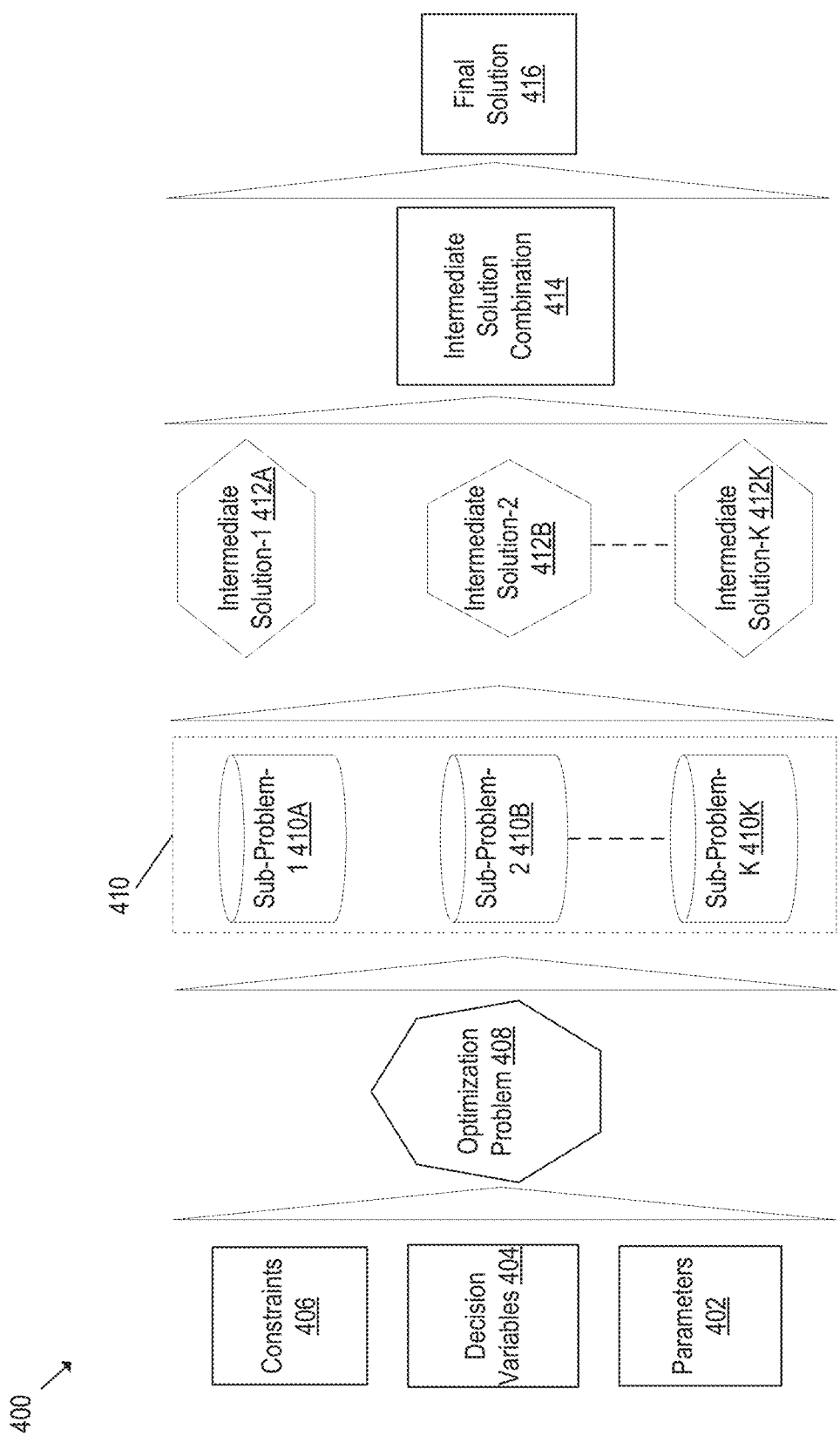
FIG. 4 is a diagram that illustrates an exemplary scenario for a solution of a vehicle routing problem (VRP) using annealer-based solvers.

FIG. 4 is a diagram that illustrates an exemplary scenario for a solution of a vehicle routing problem (VRP) using annealer-based solvers, in accordance with at least one embodiment described in the present disclosure. FIG. 4 is described in conjunction with elements from FIG. 1, FIG. 2, and FIG. 3. With reference to FIG. 4, there is shown an exemplary scenario 400. The exemplary scenario 400 may include a set of parameters 402, a set of decision variables 404, a set of constraints 406, an optimization problem 408, a set of sub-problems 410A to 410K, intermediate solutions 412A to 412K, an operation for intermediate solution combination 414, and a final solution 416. The K number of sub-problems and intermediate solutions is for exemplary purposes and should not be construed to limit the scope of the disclosure. The set of sub-problems and the intermediate solutions may include only two or greater than K number of sub-problems and intermediate solutions, respectively, without departure from the scope of the disclosure.

The processor 204 may be configured to receive the set of parameters 402 associated with the vehicle routing problem. Herein, the vehicle routing problem may be the optimization problem 408, whose goal may be to determine the set of optimal routes, between the depot 114 and the set of warehouses 116A to 116H, for the delivery of the set of items using the set of vehicles 118A and 118B. Further, the total cost associated with the set of optimal routes may correspond to the minimum cost associated with the set of possible routes between the depot 114 and the set of warehouses 116A to 116H. The set of possible routes may include all possible routes that the driver 122 may take to deliver the set of items. It may be noted that not all routes of the set of possible routes may be optimal. The travel cost associated with some of the routes may be larger than that associated with other routes. The optimization problem 408 may solve the vehicle routing problem to determine the set of optimal routes from the set of possible routes such that the travel cost associated with the set of vehicles 118A and 118B to transport the set of items to the set of warehouses 116A to 116H may be the minimum cost. The set of optimal routes between the set of warehouses 116A to 116H and the depot 114 may be determined based on the set of parameters 402. Details of the set of parameters 402 are further provided, for example, in FIG. 5A.

The processor 204 may be configured to receive the set of decision variables 404 associated with the optimization problem 408. The set of decision variables 404 may be correspond to variables whose values may be updated during the solution of the optimization problem to indicate a certain aspect related to a solution space of the optimization problem. The set of decision variables may have binary or non-binary values. A decision variable may consider binary values as "1" when the decision variable is true and "0" when the decision variable is false. Examples of the set of decision variables 404 may include the binary variable indicative of whether the vehicle type with the predefined operation time is assigned to the route, the time taken to travel from the first location to a second location in the route, and the like. Details of the set of decision variables 404 are further provided, for example, in FIG. 5A.

The processor 204 may be configured to receive the set of constraints 406 associated with the optimization problem 408 based on the received set of parameters 402 and the received set of decision variables 404. The set of constraints 406 may be one or more limitations that may bind the optimization problem 408. For example, in an embodiment, for each route, only one vehicle type and only one vehicle operation may be assigned. In an embodiment, the set of constraints 406 may be received as user inputs from the user 112 associated with the electronic device 102. In another embodiment, the set of constraints 406 may be fixed and may be automatically retrieved for example, from the database 106. Details of the set of constraints 406 are further provided, for example, in FIG. 5A.

The processor 204 may be configured to construct the optimization problem 408 based on the received set of constraints 406. As discussed, the optimization problem 408 may function of the set of constraints 406, and the goal of the optimization problem 408 may be to determine the set of optimal routes for the vehicle routing problem. A variation in the set of constraints 406 may result in a construction of a new vehicle routing problem. Hence, depending on the received set of constraints 406, the optimization problem 408 may be constructed.

The processor 204 may be configured to divide the constructed optimization problem 408 into the set of sub-problems 410A to 410K. Each of the set of sub-problems 410A to 410K may correspond to the subset of warehouses of the set of warehouses (e.g., the set of warehouses 116A to 116H). As discussed, the vehicle routing problem may be quite computationally complex due a large number of warehouses, constraints, decision variables, and parameters. Hence, the complex and costly hardware may be required to solve the vehicle routing problem. Moreover, due to the complexity of the vehicle routing problem, a computation time and computational resources required to obtain satisfactory solution may be significant. In order to mitigate the aforesaid problems associated with the VRP optimization problem 408, the VRP optimization problem 408 may be divided into the set of sub-problems 410A to 410K. Herein, each sub-problem may correspond to the subset of warehouses. With reference to FIG. 4, the optimization problem 408 may be divided into the set of sub-problems 410A to 410K. Herein, the set of sub-problems 410A to 410K may include K number of sub-problems, such as a first sub-problem 410A, a second sub-problem 410B, . . . and a Kth sub-problem 410K. Complexity of each sub-problem (such as, the first sub-problem 410A) may be lesser than the complexity of the optimization problem 408 as a whole and hence, complex hardware may not be required to solve the individual sub-problems. Also, the individual sub-problems may be solved in parallel by multiple solver, thereby further reducing the computation time required to solve the optimization problem 408.

The processor 204 may be configured to determine the intermediate solution for each of the set of sub-problems 410A-410K, using the annealer-based solver 102A, to determine the set of routes associated with the corresponding sub-problem of the set of sub-problems 410A-410K. The intermediate solution for each sub-problem may include the set of routes by which the set of vehicles 118A and 118B may transport the set of items to the subset of warehouses corresponding to the sub-problem at the minimum cost. For example, the first sub-problem 410A may be solved to obtain an intermediate solution-1 412A, the second sub-problems 410B may be solved to obtain an intermediate solution-2 412B, . . . and the Kth sub-problems 410K may be solved to obtain an intermediate solution-K 412K. Each sub-problem of the set of sub-problems may be solved either serially using a single annealer-based solver (e.g., the annealer-based solver 102A) or in parallel using multiple annealer-based solvers (such as, the annealer-based solver 102A). In order to solve each sub-problem serially, the set of sub-problems may be arranged in the queue and may be provided to the annealer-based solver 102A in a serial order. For example, the annealer-based solver 102A may first solve the first sub-problem 410A to obtain the intermediate solution1 412A. Next, the annealer-based solver 102A may solve the second sub-problem 410B to obtain the intermediate solution 412B and so on till the Kth sub-problems 410K may be solved. To solve the set of sub-problems in parallel, the set of sub-problems may be fed to the multiple annealer-based solvers at once. For example, K number of annealer-based solvers may be employed to solve the set of K sub-problems 410A-410K. A first annealer-based solver may solve the first sub-problem 410A, a second annealer-based solver may solve the second sub-problem 410B, and so on. Solving the set of sub-problems parallelly may thus need greater number of annealer-based solvers but the time taken to solve the set of sub-problems 410A-410K may be reduced. Each of the intermediate solutions 412A to 412K may be referred to as a partial solution of the optimization problem 408.

In the operation for the intermediate solution combination 414, the processor 204 may combine the intermediate solution (such as, the individual intermediate solutions 412A to 412K) associated with each of the set of sub-problems 410A to 410K to determine the final solution 416 of the optimization problem 408 based on the received set of constraints 406. Herein, the determined final solution 416 may be indicative of the set of optimal routes to be assigned to the set of vehicles (e.g., the set of vehicles 118A and 118B). As the final solution 416 may be obtained based on a combination of the intermediate solution associated with each of the set of sub-problems 410A-410K, the final solution 416 may be regarded as a complete solution of the VRP optimization problem 408. The final solution 416 may be indicative of the set of optimal routes of the VRP such that the set of vehicles 118A and 118B may transport the set of items between the set of warehouses 116A to 116H and the depot 114 at the minimum cost. Thus, the set of optimal routes may include shortest possible routes that the set of vehicles 118A and 118B may take. For example, the intermediate solution-1 412A, the intermediate solution-2 412A, . . . and the intermediate solution-K 412K may be combined to determine the final solution 416.

The processor 204 may be configured to render the determined final solution 416 of the optimization problem 408 on the display device 208A. The determined final solution 416 may be presented on the display device 208A so that the user 112, and/or the operator 120, and/or the driver 122 associated with the electronic device 102, the depot 114 and the vehicle 118B, respectively, may view the set of optimal routes. The operator 120 or the user 112 may then instruct the driver 122 of the vehicle 118B to take the set of optimal routes in order to transport the set of items between the depot 114 and the set of warehouses 116A to 116H. In an embodiment, the final solution 416 may guide the driver 122 to take the set of optimal routes.

Figure 5A:
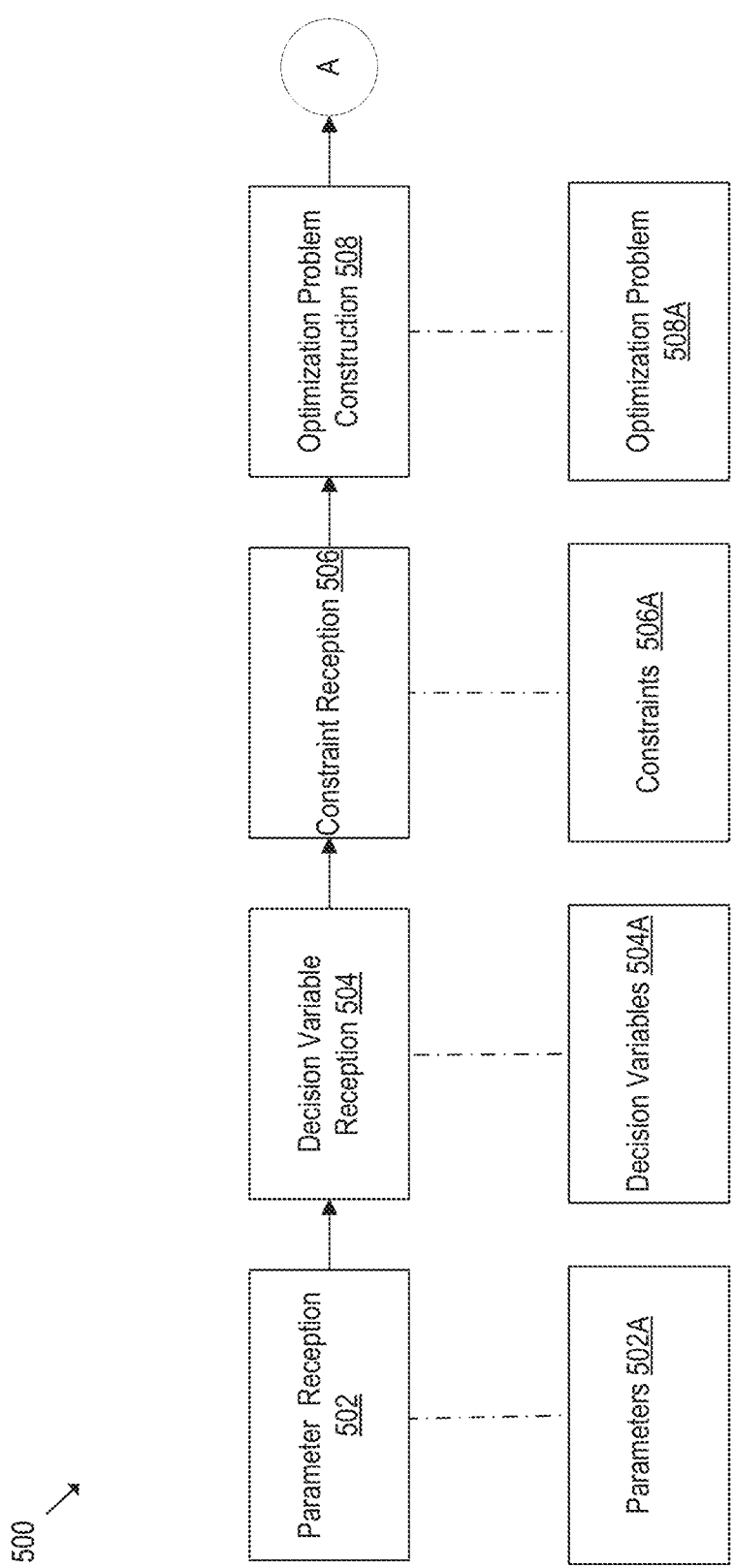
FIGS. 5A and 5B are diagrams that illustrates an execution pipeline for a solution of a vehicle routing problem (VRP) using annealer-based solvers.
Figure 5B:
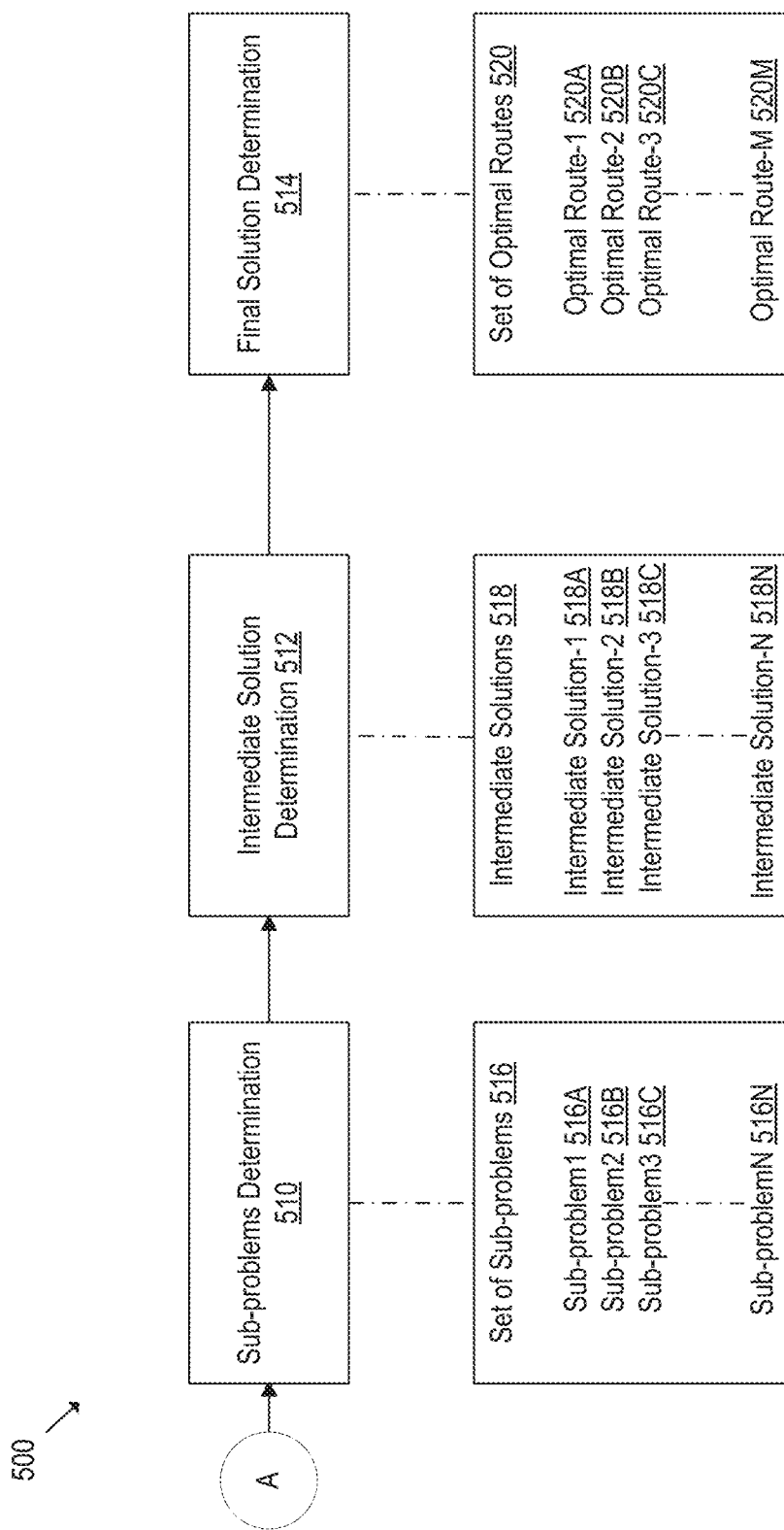

FIGS. 5A and 5B are diagrams that illustrates an execution pipeline for a solution of a vehicle routing problem (VRP) using annealer-based solvers, in accordance with an embodiment of the disclosure. FIGS. 5A and 5B are described in conjunction with elements from FIG. 1, FIG. 2, FIG. 3, and FIG. 4. With reference to FIGS. 5A and 5B, there is shown an execution pipeline 500. The exemplary execution pipeline 500 may include a set of operations that may be executed by one or more components of FIG. 1, such as, the electronic device 102. The operations may include a parameter reception operation 502, a decision variable reception operation 504, a constraint reception operation 506, an optimization problem construction operation 508, a sub-problem determination operation 510, an intermediate solution determination operation 512, and a final solution determination operation 514. The set of operations may be performed by the electronic device 102 to solve the vehicle routing problem (VRP) using annealer-based solvers (such as, the annealer-based solver 102A), as described herein.

At 502, the parameter reception operation may be executed. In the parameter reception operation, the processor 204 may be configured to receive the set of parameters (for example, parameters 502A) associated with the vehicle routing problem. Herein, the vehicle routing problem may be the optimization problem (such as an optimization problem 508A) whose goal may be to determine the set of optimal routes, between the depot 114 and a set of warehouses 116A to 116H for the delivery of the set of items using the set of vehicles 118A and 118B. The total cost associated with the set of optimal routes may correspond to the minimum cost associated with the set of possible routes between the depot 114 and the set of warehouses 116A to 116H. As discussed, the set of possible routes may include all possible routes that the driver 122 may take to deliver the set of items. In an embodiment, not all routes of the set of possible routes may be optimal. The travel cost associated with some of the routes may be larger than that associated with other routes. The vehicle routing problem may solve the optimization problem (such as, the optimization problem 508A) to determine the set of optimal routes from the set of possible routes such that the travel cost associated with the set of vehicles 118A and 118B for transportation of the set of items between the depot 114 and the set of warehouses 116A to 116H may be the minimum cost. The set of optimal routes covering the set of warehouses 116A to 116H and the depot 114 may be determined based on the set of parameters (for example, the parameters 502A).

Examples of the received set of parameters (for example, the parameters 502A) may include, but are not limited to a number of vehicles, a preparation time associated with a vehicle type, a travel time between a first location and a second location, a demand at a location for loading and/or unloading of one or more items, an iterative operation time, an unload deadline for a location, an earliest time to begin loading at a location, a maximum loading time at a location, a cost associated with a vehicle type for an operation time, a binary value indicative of whether a vehicle type may accommodate a predefined amount of one or more items, or a cost of a route.

The number of vehicles may be a total number of vehicles in the VRP optimization problem. The number of vehicles may be represented by "m". It may be noted that not all vehicles of the total number of vehicles in the VRP optimization problem may participate in the delivery of the set of items. Some vehicles may just stay at the depot 114. It may be noted that the set of vehicles may be of one or more vehicle types. In an example, the set of vehicles may include one or more of: a bike or a two-wheeler vehicle, a car, a tanker, a van, a goods truck, and the like. In another example, the vehicle type may correspond to a type of item from the set of items that may be delivered by a vehicle of the vehicle type. In an embodiment, the set of items may include items of various types, such as items of a first item type, items of a second item type, . . . and items of an nth item type. A vehicle type A may deliver the items of the first item type, a second vehicle type B may deliver the items of the second item type, . . . and an Nth vehicle type N may deliver the items of the Nth item type.

The preparation time associated with the vehicle type may correspond to a time taken by the vehicle type, before a vehicle of the vehicle type may be used for transportation of the set of items between the depot 114 and the set of warehouses 116A to 116H. The preparation time for a vehicle type "u" may be denoted as "$b_u$". Example of the preparation time may include time taken to refuel a vehicle of the vehicle type, and service the vehicle (for example, time taken to change brake fluids, and the like).

The travel time between the first location and the second location may be a time taken by the set of vehicles (e.g., the set of vehicles 118A and 118B) to travel from the first location to the second location. The first location and the second location may be represented in terms of geographical locations or geographical coordinates. In an embodiment, the first location may correspond to one warehouse of the set of warehouses 116A to 116H and the second location may correspond to another warehouse of the set of warehouses 116A to 116H. For example, the first location may be the geographical location or coordinates of the warehouse 116A and the second location may be the geographical location or coordinates of the warehouse 116H. In another embodiment, the first location may be the location of the depot 114 and the second location may be the location of any warehouse of the set of warehouses 116A to 116H. A distance between a warehouse "u" and a warehouse "v" may be denoted as "$d_{u,v}$".

The demand at a location for loading and/or unloading of one or more items may provide an amount of time needed for loading and/or unloading at the location. It may be appreciated that different locations may have different demands. For example, the warehouse 116A may require supply of one ton of steel rods and the warehouse 116E may require supply of 500 kilograms of steel rods, and 500 kilograms of cement. Herein, the set of vehicles 118A and 118B may unload one ton of steel rods at the warehouse 116A and may unload 500 kilograms of steel rods, and 500 kilograms of cement at the warehouse 116E. A demand at the warehouse "w" for load/unload type "α" may be represented as "$D_{w,\alpha}$". Herein, α may denote a type of action to be performed at the warehouse "w". The type of action may be a load type, where one or more items may be loaded to the vehicle at the warehouse "w", or an unload type, where one or more items may be unloaded to the vehicle at the warehouse "w".

It may be noted that any route from the set of optimal routes may include a number of iterative operations. One iterative operation of a vehicle may include a trip of the vehicle from one warehouse to a next warehouse in the route or from the depot 114 to the next warehouse in the route. For example, in a first iterative operation the vehicle 118A may travel from the warehouse 116A to the warehouse 116B and in a second iterative operation the vehicle 118A may travel from the warehouse 116B to the warehouse 116C. The iterative operation time may be time taken to perform one iterative operation and an $i^{th}$ operation time may be denoted as "$O_i$", where i may take any whole number as 0, 1, 2 and so on.

The unload deadline for the location for the location may be a time deadline within which the unload demand for the location is to be satisfied. The unload deadline may vary from location to location and may depend on factors such as, an opening time of the location, a closing time of the location, and so on. For example, the unload deadline for the warehouse 116A may be "8:00 PM". Herein, the vehicle 118A may unload, for example, raw materials by "8:00 PM". Thus, the set of optimal routes may be so chosen that the raw materials may be unloaded at the warehouse 116A by "8:00 PM". The unload deadline for the warehouse "w" may be represented as "$E_w$".

The earliest time to begin loading at the location may indicate a time after which a vehicle at the location may start to load. The earliest time to begin loading may vary from location to location and may depend on factors such as, the opening time of the location, a closing time of the location, and so on. For example, the depot 114 may begin loading of cement from "7:00 AM". Hence, the set of vehicles 118A and 118B may arrive at the depot 114 for loading at or after "7:00 PM". Before "7:00 AM", the depot 114 may not accept any loading request. The earliest time loading may begin at the warehouse "w" may be represented as "$S_w$".

The maximum loading time at a location may be a time limit within which the loading may be performed at the location. The maximum loading time may vary from location to location and may depend on factors such as, the opening time of the location, a closing time of the location, and the like. For example, the maximum loading time at depot 114 may be "10:00 PM". Hence, the set of vehicles 118A and 118B may be loaded at the depot 114 before "10:00 PM". The maximum loading time at the warehouse "w" may be represented as "$M_w$".

The cost associated with the vehicle type for the operation time may provide a cost incurred for operating the vehicle type for the operation time. For example, the cost associated with the vehicle type for the operation time may be a summation of a cost associated with an amount of fuel consumed by the vehicle type for the operation time, a cost associated with renting the vehicle type for the operation time, a cost associated due to malfunctioning of the vehicle type for the operation time and the like. As a time covered in each operation time may be different, the cost associated with the vehicle type for each operation time may vary. The cost associated with the vehicle type "u" for an operation time "o" may be function of the vehicle type "u" and the operation time "o" and may be represented as "cost (u, o)".

The binary value indicative of whether the vehicle type can accommodate the predefined amount of one or more items may take values as "0" or "1". The binary value (i.e., indicative of whether the vehicle type can accommodate the predefined amount of one or more items) may depend on a capacity of the vehicle type and may be "1" if the vehicle type can accommodate the predefined amount of one or more items and "0" otherwise. The binary value indicating whether the vehicle type u may accommodate "i" and "j" amounts of items "a" and "b", respectively, may be represented as "$F_{u,i,j}$". Herein, if the vehicle type u may accommodate "i" and "j" amounts of items "a" and "b", respectively, then "$F_{u,i,j}$" may be set to "1", else "$F_{u,i,j}$" may be set to "0".

The cost of the route may be a total cost that may be incurred when the set of vehicles 118A and 118B may take the route to transport the set of items between the depot 114 and the set of warehouses 116A to 116H. The cost of the route may depend on parameters such as, a total distance traversed along the route, a traffic condition in the route, a vehicle type, a cost of renting the vehicle for the route, a cost of hiring the driver (for example, the driver 122 of the vehicle 1188) for the route and the like. The cost of a route "r" may be represented as "rcost (r)".

In addition to the set of parameters (e.g., the parameters 502A), a set of indices may be pre-defined for the optimization problem 508A. Examples of the set of indices may include, but are not limited to, a set of operation times, a set of vehicle types, a number of vehicles, a set of warehouses, and a set of actions (e.g., a loading action and an unloading action).

At 504, the decision variable reception operation may be executed. In the decision variable reception operation, the processor 204 may be configured to receive the set of decision variables (e.g., decision variables 504A) associated with an optimization problem (e.g., the optimization problem 508A). The decision variables 504A may correspond to variables whose values may be updated during the solution of the optimization problem 508A to indicate a certain aspect related to a solution space of the optimization problem 508A. The decision variables 504A may have binary or non-binary values. A decision variable may consider binary values as "1" when the decision variable is true and "0" when the decision variable is false.

Examples of the received set of decision variables (e.g., the decision variables 504A) may include, but are not limited to, a binary variable indicative of whether a vehicle type with a predefined operation time may be assigned to a route, a time taken to travel from a first location to a second location in a route, a total time taken between two locations, a warehouse visited at a location in a route, an amount of loading or unloading of one or more items at a location in a route, a binary variable indicative of whether a loading or unloading action may be performed at a location associated with a warehouse in a route, a binary variable indicative of whether a final loading candidate may be complete for a warehouse at a location in a route, a total amount of loading or unloading of one or more items, an amount of loading or unloading of one or more items at a warehouse in a route, or a binary variable indicative of whether a loading at warehouses in a route may be done in a time that satisfies a maximum loading time constraint.

The binary variable (i.e., indicative of whether the vehicle type with the predefined operation time is assigned to the route) may be set to "1" when the vehicle type with the predefined operation time is assigned to the route and may be set to "0" otherwise. The binary variable indicative of whether the vehicle type "u" with operation time "o" is assigned to route "r" may be represented as "$x_{u,o,r}$". Herein, if the vehicle type "u" with operation time "o" is assigned to route "r", "$x_{u,o,r}$" may be considered as "1" and if the vehicle type "u" with operation time "o" is not assigned to route "r", "$x_{u,o,r}$" may be considered as "0".

The time taken to travel from the first location to the second location in the route may provide an average time taken to travel from the first location to the second location. The time taken to travel from the first location to the second location in the route may depend on a type of the vehicle that travels on the route, a traffic condition of the route, a whether condition, a condition of roads connecting the first location and the second location, and the like. If the first location is visited at a step "p−1" and the second location is visited at step "p", the time taken to travel from step "p−1" to "p" for route "r" may be represented as "$\tau_{r,p}$" that may include any positive decimal number from "1" for the route "r".

The total time taken between two locations may be a sum of time taken to travel the two locations, loading/unloading time, and waiting time. Total time taken to travel from step "p−1" to "p" for route "r" may include loading/unloading time and waiting time. Herein, the waiting time may be a time duration for which the vehicle may need to wait due to several reasons, such as, another vehicle being loaded/unloaded. In some cases, if the vehicle visits a location before the earliest time to begin loading at the location, then the vehicle may need to wait at the location which may increase the waiting time of the vehicle at the location. If the first location is visited at a step "p−1" and the second location is visited at step "p", the total time taken to travel from the step "p−1" to the step "p" for route "r" may be represented "$\tau_{r,p}^T$".

The warehouse that may be visited at the step "p" in route "r" may be denoted as "$w_{r,p}$" and may be assigned a whole number. Each warehouse of the set of warehouses 116A to 116H and the depot 114 may be assigned a particular number. For example, the depot 114 may be assigned as "0", the warehouse 116A may be assigned as "1", the warehouse 116B may be assigned as "2", and so on. Herein, if the warehouse 116A is visited at the step "p" in the route "r", then "$w_{r,p}$" may be "1".

The amount of loading or unloading of one or more items at a location in the route may be provided in units such as, kilograms, for the one or more items that may be solid, provided in units, such as, liters, for the one or more items that are liquid, and the like. The amount of loading or unloading of an item "a" or an item "b" done at step "p" while visiting the location on route "r" may be represented as:

$$c_{r,w,p,\alpha} \in N,$$

where $\alpha \in \{la, lb, ua, ub\}$. Herein, "$\alpha$" may denote a type of action. The type of action "$\alpha$" may be: "la" when the first item "a" needs to be loaded, "lb" when the second item "b" needs to be loaded, "ua" when the first item "a" needs to be unloaded, and "ub" when the second item "b" needs to be unloaded. If the first item "a" needs to be loaded and the second item "b" need to be unloaded at the location, "$C_{r,w,p,\alpha}$" may provide an amount of the first item "a" that is loaded and an amount of the second item "b" that is unloaded at the location.

The binary variable indicative of whether the loading or unloading action is performed at the location associated with the warehouse in the route may be set as "1" when the loading or unloading action is performed at the location associated with the warehouse in the route. The binary variable indicative of whether the loading or unloading action "a" is performed on route "r", at step "p", while visiting warehouse w may be represented as:

$$a_{r,w,p,\alpha} \in \{0,1\},$$

"$a_{r,w,p,\alpha}$" may be set as "1" when the loading or unloading action "$\alpha$" is performed on route "r", at step "p", while visiting warehouse "w", and may be set as "0" when neither the loading nor unloading action "$\alpha$" is performed on route "r", at step "p", while visiting warehouse "w".

The binary variable indicative of whether the final loading candidate is complete for the warehouse at the location in the route may correspond to whether the vehicle being loaded at the warehouse is the final loading candidate. The binary variable indicative of whether the final loading candidate for a warehouse "i" is completed at step "p" at the location in the route "r" may be represented as:

$$f_{r,p,i} \in \{0,1\},$$

where "$f_{r,p,i}$" may be "0" when the final loading candidate for the warehouse "i" is not completed at step "p" at the location in the route "r", and "1" when the final loading candidate for the warehouse "i" is completed at step "p" at the location in the route "r".

The total amount of loading or unloading of one or more items may be determined based on a summation of an amount of loading or unloading of each item of the one or more items. The total amount of loading or unloading of the first item "a" or the second "b" for an action type "i", where $i \in \{la, lb, ua, ub\}$ may be represented as:

$$c_{r,i} \in N.$$

For example, if 1000 kilograms of the item "a" are loaded and 500 kilograms of the item "b" are unloaded, "$c_{r,i}$" may be 1500.

The amount of loading or unloading of one or more items at the warehouse in the route may be found based on a summation of an amount of loading or unloading of the one or more items at the warehouse for all steps in the route. The amount of loading or unloading of the one or more items given by the action type "α" for the warehouse "w" in the route "r" may be represented as:

$$r_{w,\alpha} \in N.$$

For example, if at step "2", 1000 kilograms of the item "a" are loaded, and at step "100", 500 kilograms of the item "a" are loaded for the warehouse "w", the amount of loading or unloading of the item "a" at the warehouse "w" in the route may be determined as 1500.

The binary variable (i.e., indicative of whether the loading at warehouses in the route is done in the time that satisfies the maximum loading time constraint) may be "1" when the loading at the warehouses may be done before the maximum loading time. In case the loading at the warehouses is done such that the time does not satisfy the maximum loading time constraint, the aforementioned binary variable may attain a value of "0". The binary variable indicative of whether the loading for warehouses done in route "r" such that the time satisfies the maximum loading time max may be represented as:

$$r_{w,max} \in \{0,1\}.$$

At 506, the constraint reception operation may be executed. In the constraint reception operation, the processor 204 may be configured to receive the set of constraints (for example, constraints 506A) associated with the optimization problem 508A based on the received set of parameters (for example, the parameters 502A) and the received set of decision variables (for example, the decision variables 504A). The set of constraints (for example, the constraints 506A) may be one or more limitations that may bind the optimization problem 508A. The set of constraints may be received as user inputs from the user 112 associated with the electronic device 102. In another embodiment, the set of constraints may be predefined and may be automatically retrieved, for example, from the database 106.

Examples of the constraints 506A may include at least one of, but not limited to, a vehicle type constraint, an action type constraint, a distance validation constraint, a total time constraint, a task and amount matching validation constraint, a route end and stay validation constraint, a disabled route enforcement constraint, a demand constraint, an operation time constraint, a deadline constraint, a maximum load time constraint, a capacity computation constraint, or a vehicle capacity constraint.

The vehicle type constraint may be constraints pertaining to the vehicle type. The vehicle type constraint may define that for each route, exactly one vehicle type and one operation type may be chosen. Thus, a sum of the binary variable (i.e., indicative of whether the vehicle type with the predefined operation time is assigned to the route, for all routes and vehicle types), may be "1", which may be represented by an equation (1), as follows:

$$\Sigma x_{u,o,r} = 1, \forall r \qquad (1)$$

where, "$x_{u,o,r}$" may represent the binary variable indicative of whether the vehicle type "u" with the predefined operation time "o" is assigned to the route "r". That is, if the vehicle type "u", for example, a tanker, is assigned for the route "r", then a vehicle type "v", for example, a car, may not be assigned to the same route "r". Thus, a specific route may be assigned only to a specific vehicle type.

The action type constraint may define that only one action type may be chosen for each step of each route, which may be represented by an equation (2), as follows:

$$\Sigma_i a_{r,w,p,i} = 1, \forall r,p,w \qquad (2)$$

where, "$a_{r,w,p,i}$" may represent the binary variable indicative of whether an action type "i" is performed on route "r", at step "p", while visiting the warehouse "w". Herein, the action type "i" may be an unloading action or a loading action. Thus, if at step "p", while visiting the warehouse "w", on route "r", the loading action is performed, then at step "p", the unloading action may not be performed.

The distance validation constraint may state that if the warehouse "u" is visited at step "p−1" and warehouse "v" is visited at step "p" of the route "r", then the time taken may correspond to the values in a distance matrix. Herein, the distance matrix may be a table that may include distances between various pairs of warehouses of the set of warehouses 116A to 116H, and distances between the depot 114 and any warehouse of the set of warehouses 116A to 116H. It may be noted as time and distance may be directly proportional to each other, the time and distance measures may be interchangeable in the VRP optimization problem 508A. Thus, the VRP optimization problem 508A may be solved to obtain the set of optimal routes at a minimum cost based on a minimization of a distance traveled on the route or a time taken to travel on the route. The distance validation constraint may be represented by an equation (3), as follows:

$$\text{if } a_{r,u,p-1,\alpha_1} \land a_{r,v,p,\alpha_2} = 1 \text{ then } \tau_{r,p} = d_{u,v}, \forall r,p,\alpha_1,\alpha_2 \qquad (3)$$

where, "$a_{r,u,p-1,\alpha_1}$" may represent the binary variable indicating whether an action type "α1" (for example, unloading or loading) is performed on the route "r" at step "p−1" while visiting the warehouse "u", "$a_{r,v,p,\alpha_2}$" may represent the binary variable indicating whether an action type "α2" (for example, unloading or loading) is performed on the route "r" at step "p" while visiting the warehouse "v", "$\tau_{r,p}$" may represent the time taken to travel from step "p−1" to "p" for route "r", and "$d_{u,v}$" may represent the time to travel from the warehouse "u" to the warehouse "v".

The total time constraint may be constraints on the total time. The total time constraint states that the total time includes loading/unloading time. If the vehicle type "u" with operation time "o" is assigned to route "r", then the total time taken to travel (including loading/unloading time, and waiting time) from step "0" to the next step, say the step "p−1" for route "r", may be greater than or equal to the sum of the time taken to travel from step "0" to the next step, and the preparation time associated with the vehicle type "u". This may be represented by an equation (4), as follows:

$$\text{if } x_{u,o,r} = 1 \text{ then } \tau_{r,0}^T \geq \tau_{r,0} + b_u, \forall r,o,p \qquad (4)$$

where, "$x_{u,o,r}$" may represent the binary variable indicative of whether the vehicle type "u" with operation time "o" is assigned to route "r", "$\tau_{r,0}^T$" may represent the total time taken (including loading/unloading time, and waiting time) to travel from step "0" to the next step, say the step "p−1" for route "r", "$\tau_{r,0}$" may represent time taken to travel from step "0" to next step, say the step "p−1" on route "r", and "$b_u$" may represent the preparation time associated with the vehicle type "u".

Herein, at step "0", the vehicle type "u" may be at the depot 114. Thus, the vehicle type "u" may start from the depot 114 at step "0". If the action type "a" (for example, unloading or loading) is performed on route "r" at step "p", while visiting the warehouse "w", then the total time taken to travel (including loading/unloading time, and waiting time) from the step "p−1" to the step "p" for route "r" may be greater than or equal to the sum of the time taken to travel from the step "p−1" to the step "p" on route "r" and the preparation time associated with the vehicle type "u". The aforementioned constraint may be represented by an equation (5), as follows:

$$\text{if } a_{r,w,p,\alpha}=1 \text{ then } \tau_{r,p}^{T} \geq \tau_{r,p}+b_u; \forall r,w,\alpha>0,p>0 \quad (5)$$

If the route "r" at step "p" while visiting a warehouse "0" is disabled, (i.e., no action is performed at warehouse "0" on the route "r"), then the total time taken to travel (including loading/unloading time, and waiting time) from the step "p−1" to the step "p" on the route "r" may be greater than or equal to the time taken to travel from the step "p−1" to the step "p" on route "r". The aforementioned may be represented by an equation (6), as follows:

$$\text{if } a_{r,0,p,\text{``}d\text{''}}=1 \text{ then } \tau_{r,p}^{T} \geq \tau_{r,p}; \forall r, p \neq 0 \quad (6)$$

where, "$a_{r,0,p,\text{``}d\text{''}}$" may represent a binary variable indicative of whether the step "p" while visiting the warehouse "w" on the route "r" is disabled. Herein, "p" may not be taken as "0", as at step "0" the vehicle may be at the depot 114.

The task and amount matching validation constraint may correspond to constraints pertaining to the action type to be performed for a location in the route and the amount of loading or unloading of one or more items at the location in the route. In case the one or more items includes the first item "a" and the second item "b" and if the loading action type "l" is performed on the route "r" at step "p" while visiting the warehouse "w", then a sum of an amount of loading of the first item "a" and an amount of loading of the second item "b" at the step "p" on the route "r" while visiting the warehouse "w" may be greater than zero. Thus, at least one of the first item "a" and/or the second item "b" may be loaded at the step "p". The aforementioned constraint may be represented by an equation (7), as follows:

$$\text{if } a_{r,w,p,\text{``}l\text{''}}=1 \text{ then } c_{r,p,w,\text{``}la\text{''}}+c_{r,p,w,\text{``}lb\text{''}}>0; \forall r,p \quad (7)$$

where, "$a_{r,w,p,\text{``}l\text{''}}$" may represent a binary variable indicative of whether the loading action type "l" may be performed at step "p" while visiting the warehouse "w" on the route "r", "$c_{r,p,w,\text{``}la\text{''}}$" may represent the amount of loading of the first item "a" at the location "p" while visiting the warehouse "w" on the route "r", and "$c_{r,p,w,\text{``}lb\text{''}}$" may represent the amount of loading of the second item "b" at the location "p" while visiting the warehouse "w" on the route "r".

If the unloading action type "u" is performed on the route "r" at step "p" while visiting the warehouse "w", then a sum of an amount of unloading of the first item "a" and an amount of unloading of the second item "b" at the step "p" on the route "r" while visiting the warehouse w may be greater than zero. Thus, at least one of the first item "a" and/or the second item "b" may be unloaded at the step "p". The aforementioned constraint may be represented by an equation (8), as follows:

$$\text{if } a_{r,w,p,\text{``}u\text{''}}=1 \text{ then } c_{r,p,w,\text{``}ua\text{''}}+c_{r,p,w,\text{``}ub\text{''}}>0; \forall r,p \quad (8)$$

where, "$a_{r,w,p,\text{``}u\text{''}}$" may represent a binary variable indicating whether the unloading action type "u" may be performed at step "p" while visiting the warehouse "w" on the route "r", "$c_{r,p,w,\text{``}ua\text{''}}$" may represent the amount of unloading of the first item "a" at the location "p" while visiting the warehouse "w" on the route "r", and "$c_{r,p,w,\text{``}ub\text{''}}$" may be the amount of unloading of the second item "b" at the location "p" while visiting the warehouse "w" on the route "r".

If the loading action type "u" is not performed on the route "r" at step "p" while visiting the warehouse "w", then a sum of an amount of loading of the first item "a" and an amount of loading of the second item "b" at the step "p" on the route "r" while visiting the warehouse "w" may be zero. That is, neither the first item "a" nor the second item "b" may be loaded at the step "p" as represented by an equation (9), as follows:

$$\text{if } a_{r,w,p,\text{``}l\text{''}}=0 \text{ then } c_{r,p,w,\text{``}la\text{''}}+c_{r,p,w,\text{``}lb\text{''}}=0; \forall r,p \quad (9)$$

If the unloading action type "u" is not performed on the route "r" at step "p" while visiting the warehouse "w", then a sum of an amount of unloading of the first item "a" and an amount of unloading of the second item "b" at the step "p" on the route "r" while visiting the warehouse "w" may be zero (i.e., neither the first item "a" nor the second item "b" may be unloaded at the step "p"), as represented by an equation (10), as follows:

$$\text{if } a_{r,w,p,\text{``}u\text{''}}=0 \text{ then } c_{r,p,w,\text{``}la\text{''}}+c_{r,p,w,\text{``}lb\text{''}}>0; \forall r,p \quad (10)$$

If the action type "a" is performed on the route "r" at step "p" while visiting the warehouse "u", then the warehouse that may be visited at step "p" in route "r" may be to the warehouse "u", as represented by an equation (11), as follows:

$$\text{if } a_{r,u,p,\alpha}=1 \text{ then } w_{r,p}=u; \forall r,p,\alpha \quad (11)$$

where, "$a_{r,u,p,\alpha}$" may represent a binary variable indicating whether the action type "α" is performed on the route "r" at step "p" while visiting the warehouse "u", and "$w_{r,p}$" may represent a warehouse that is visited at step "p" on the route "r".

The route end and stay validation constraint may include a route end constraint, and a stay validation constraint. The route end constraint may state that once a vehicle returns to the depot 114, the vehicle may not visit any other warehouses afterwards (i.e., the vehicle may return to the depot 114 at the end of each route after visiting warehouses in the route), as represented by an equation (12), as follows:

$$\text{if } a_{r,0,p,\alpha}=1 \text{ then } a_{r,0,p+1,\alpha}=1; \forall r,p, \quad (12)$$

where, "$a_{r,0,p,\alpha}$" may represent a binary variable indicating whether the action type "α" is performed on the route "r" at step "p" while visiting the depot 114, and "$a_{r,0,p+1,\alpha}$" if may represent a binary variable indicating whether the action type "α" is performed on the route "r" at step "p+1" while visiting the depot 114. Thus, if the vehicle has returned to the depot 114 at step "p", then the vehicle may stay at the depot 114 at the step "p+1" as well.

The vehicle may not stay at any warehouse of the set of warehouses 116A to 116H for two consecutive steps such as, step "p" and step "p+1". The aforementioned constraint may be represented by an equation (13), as follows:

$$\text{if } a_{r,w,p,\alpha}=1 \text{ then } a_{r,w,p+1,\alpha}=0; \forall r,p,w>0 \quad (13)$$

where "$a_{r,w,p,\alpha}$" may represent a binary variable indicating whether the action type "α" is performed on the route "r" at step "p" while visiting the warehouse "w", and "$a_{r,w,p+1,\alpha}$" may represent a binary variable indicating whether the action type "α" is performed on the route "r" at step "p+1" while visiting the warehouse "w". Thus, if the action type "α" is performed on the route "r" at step "p" while visiting the warehouse "w", then the action type "a" may not be performed on the route "r" at step "p+1" while visiting the warehouse "w" (i.e., at step "p+1", the vehicle may not stay at the warehouse "w").

It may be noted that, the number of vehicles of the set of vehicles may not be known. Hence, a large number of vehicles may be assigned in the set of vehicles and some routes may be trivial routes. Some vehicle types may not do anything and may stay at the depot 114. The disabled route enforcement constraint may enforce the above condition. Herein, if a vehicle type say, a vehicle type "0" is chosen for a route such that the vehicle may not visit any warehouses, then the vehicle may stay at the depot 114 and may be disabled for the route. The aforementioned condition may be represented by an equation (14), as follows:

$$\text{if } x_{0,t,r}=1 \text{ then } a_{r,0,0,\text{``}d\text{''}}=1; \forall r,t \tag{14}$$

where, "$x_{0,t,r}$" may represent a binary variable indicating whether the vehicle type "0" with operation time "t" is assigned to route "r", and "$a_{r,0,0,\text{``}d\text{''}}$" may represent a binary variable indicating whether a disabled action type "d" is performed by a vehicle of type "0" on the route "r" at step "p" while visiting the warehouse "0", i.e., the depot 114. Therefore, in case the vehicle type "0" with operation time "t" is assigned to route "r" and performs the disabled action type "d" at step "p" while visiting the warehouse "0" (i.e., the depot 114), then the vehicle type "0" may not visit any warehouses on the route "r".

The demand constraint may ensure that the loading or unloading demands at each warehouse is met. Therefore, a sum of an amount of the loading or unloading of the first item "a" or the second item "b" at step "p" on a route "r" for the warehouse "w" may be equal to the demand at the warehouse "w" for a load/unload action type "α". The demand constraint may be represented by an equation (15), as follows:

$$\Sigma c_{r,w,p,\alpha}=D_{w,\alpha}; \forall w, \alpha \in \{ua,ub,la,lb\} \tag{15}$$

where, "$c_{r,w,p,\alpha}$" may represent an amount of loading or unloading of the first item "a" or the second item "b" done at step "p" on route "r" for the action type "α", and "$D_{w,\alpha}$" may represent a demand at the warehouse "w" for a load/unload action type "α".

The operation time constraint may ensure that a total travel time for each route is less than a chosen operation time for the particular route. The operation time constraint may be represented by an equation (16), as follows:

$$\text{if } x_{u,i,r}=1 \text{ then } \Sigma_p \tau_{r,p}^T \leq O_i; \forall i,r,u \tag{16}$$

where, "$x_{u,i,r}$" may represent a binary variable indicating whether the vehicle type "u" with operation time "i" is assigned to route "r", "$\tau_{r,p}^T$" may represent a total time taken to travel (including loading/unloading time, and waiting time) from step "p−1" to "p" for route "r", and "$O_i$" may represent the chosen operation time. Thus, sum of the total time taken to travel (including loading/unloading time and waiting time) from step "p−1" to "p" for route "r" for all steps in the route "r" may be less than the chosen operation time "$O_i$".

The deadline constraint may ensure that each unload action occurs before the corresponding unload deadline, as represented by an equation (17), as follows:

$$\text{if } a_{r,w,p,\text{``}u\text{''}}=1 \text{ then } \Sigma_{p' \leq p} \tau_{r,p'}^T \leq E_w; \forall r,w,p \tag{17}$$

where, "$a_{r,w,p,\text{``}u\text{''}}$" may represent a binary variable indicating whether the unloading action type "u" is performed on the route "r" at step "p" while visiting the warehouse "w", "$\tau_{r,p'}^T$" may represent a total time taken to travel from step "p'−1" to step "p'", and, "$E_w$" may represent the unload deadline for the warehouse "w". Thus, the sum of "$\tau_{r,p'}^T$" for each step "p" less than or equal to (or prior to) step "p" may be less than the unload deadline "$E_w$". Therefore, the unload deadline for each location may be met.

The deadline constraint may further ensure that each load action may occur after the corresponding earliest time to begin loading at the location, as represented by an equation (18), as follows:

$$\text{if } a_{r,w,p,\text{``}l\text{''}}=1 \text{ then } \Sigma_{p' \leq p} \tau_{r,p'}^T \geq S_w; \forall r,w,p \tag{18}$$

where, "$a_{r,w,p,\text{``}l\text{''}}$" may represent a binary variable indicating whether the loading action type "l" is performed on the route "r" at step "p" while visiting the warehouse "w", "$\tau_{r,p'}^T$" may represent the total time taken to travel from step "p'−1" to step "p'" on the route "r", and "$S_w$" may represent the earliest time to begin loading at the warehouse "w". Thus, sum of "$\tau_{r,p'}^T$" for each step "p" less than or equal to (or prior to) the step "p" may be less than "$S_w$". Therefore, the loading at each warehouse may done after the corresponding earliest time.

The maximum load time constraint may ensure that every step that is chosen as the last loading for a warehouse may have a load action for the particular warehouse, as represented by an equation (19), as follows:

$$\text{if } f_{r,p,w}=1 \text{ then } a_{r,w,p,\text{``}l\text{''}}=1 \tag{19}$$

where, "$f_{r,p,w}$" may represent a binary variable indicating whether the final loading candidate for warehouse "w" is completed at step "p" of route "r". If the final loading candidate for warehouse "w" is completed at step "p" of route "r", then the loading action type "l" may have been performed on the route "r" at step "p" while visiting the warehouse "w".

The maximum load time constraint may further ensure that final loading occurs after the maximum loading time, as represented by an equation (20), as follows:

$$\text{if } f_{r,p,w}=1 \text{ then } \Sigma_{p' \leq p} \tau_{r,p'}^T \geq M_w; \forall r,w,p \tag{20}$$

where, "$M_w$" may represent the maximum loading time at the warehouse "w".

The capacity computation constraint may include constraints on computing capacity values. Herein, a total amount of loading or unloading of the first item "a" or the second item b in a route "r" may be greater than or equal to the sum of amount of loading or unloading of the first item "a" or the second item "b" done at each step when visiting each warehouses on the route "r". The aforementioned constraint may be represented by an equation (21), as follows:

$$c_{r,i} \leq \Sigma_{p,w} c_{r,p,w,i}; \forall r, i \in \{la,lb,ua,ub\} \tag{21}$$

where, "$c_{r,i}$" may represent the total amount of loading or unloading of the first item "a" or the second item "b", and "$c_{r,p,w,i}$" may represent the amount of loading or unloading of the first item "a" or the second item "b" done at step "p" when visiting warehouse "w" on the route "r".

The vehicle capacity constraint may ensure that each vehicle may have the correct loading/unloading capacity. The vehicle capacity constraint related to loading may be represented by an equation (22), as follows:

$$\text{if } x_{u,o,r}=1, \text{ then } F_{u,c_{r,\text{``}la\text{''}},c_{r,\text{``}lb\text{''}}}=1; \forall r,u,o \tag{22}$$

where, "$x_{u,o,r}$" may represent a binary variable indicating whether the vehicle type "u" with operation time "o" is assigned to route "r", and "$F_{u,cr,"la",cr,"lb"}$" may represent a binary variable indicating whether the vehicle type "u" may load "$c_r$" amount of the first item "a" and also load "$c_r$" amount of the second item "b". The vehicle capacity constraint related to unloading may be represented by an equation (23), as follows:

$$\text{if } x_{u,o,r}=1, \text{ then } F_{u,c_r,"ua",c_r,"ub"}=1; \forall r; u, o \quad (23)$$

where, $F_{u,cr,"ua",cr,"ub"}$ may be a binary variable indicating whether the vehicle type "u" may unload "$c_r$" amount of the first item "a" and also unload "$c_r$" amount of the second item "b".

At 508, the optimization problem construction operation may be executed. In the optimization problem construction operation, the processor 204 may be configured to construct the optimization problem 508A based on the constraints 506A. As discussed, the optimization problem 508A may be the function of the constraints 506A, and the goal of the optimization problem 508A may be to determine the set of optimal routes for the vehicle routing problem. A variation in the constraints 506A may result in a construction of a new vehicle routing problem. Hence, depending on the received constraints 506A, the optimization problem 508A may be constructed.

In an embodiment, the optimization problem 508A may include a first objective function configured to minimize a total cost associated with an assignment of a route to a vehicle type for an operation time, for each route in the set of possible routes. The first objective function may be represented by an equation (24), as follows:

$$OF_1 = \min \Sigma_r \text{cost}(u,o) x_{u,o,r} \quad (24)$$

where, "$OF_1$" may represent the first objective function, "cost(u,o)" may represent a cost of an operation of the vehicle type "u" for operation time "o", and "$x_{u,o,r}$" may represent a binary variable indicating whether the vehicle type "u" with the operation time "o" is assigned to the route "r".

It may be noted that the total cost of the first objective function may be minimized based on a minimization of a distance covered on the route or based on a time taken to travel the route. It may be noted that the cost of the operation of the vehicle type "u" for operation time "o" may include a cost of renting the vehicle type "u" for the operation "o", fuel costs, service costs and the like. In an example, a truck may be rented out. Herein, if the cost of renting the truck for 1 day or for half a day may be same. In such a case, renting the truck for 1 full day may be optimal. Thus, the first objective function may try to minimize the time taken (or distance covered) to travel the route in order to minimize the total cost.

At 510, the sub-problem determination operation may be executed. In sub-problem determination operation, the processor 204 may be configured to divide the constructed optimization problem 508A into a set of sub-problems 516. Each of the set of sub-problems 516A may correspond to the subset of warehouses of the set of warehouses 116A to 116H. As discussed, the vehicle routing problem may be computationally complex due to a large number of warehouses, constraints, decision variables, and parameters. Hence, complex hardware may be required to solve the VRP optimization problem 508A. Moreover, due to the complexity of the vehicle routing problem, a computation time to obtain satisfactory solution of the VRP may be significant. In order to mitigate aforesaid problems associated with the VRP, the VRP may be divided into the set of sub-problems 516. Herein, each of the set of sub-problems 516 may correspond to the subset of warehouses. With reference to FIG. 5B, the optimization problem 508A may be divided into the set of sub-problems 516A. Herein, the set of sub-problem 516 may include N number of sub-problems such as, a sub-problem-1 516A, a sub-problem-2 516B, . . . and a sub-problem-N 516N. Complexity of each sub-problem (such as, the sub-problem-1) may be lesser than the complexity of the overall optimization problem 508A. Hence, the individual sub-problems of the set of sub-problems 516 may be solved using relatively inexpensive solvers (such as, digital annealer-based solvers).

At 512, the intermediate solution determination operation may be executed. In the intermediate solution determination operation, the processor 204 may be configured to determine the intermediate solution for each of the set of sub-problems 516, using the annealer-based solver 102A, to determine the set of routes associated with the corresponding sub-problem of the set of sub-problems. As discussed, the VRP problem may be divided into the set of sub-problems 516 to reduce the complexity. Next, each sub-problem may be solved using the annealer-based solver 102A to determine the intermediate solution for the corresponding sub-problem. Herein, each sub-problem may be associated with certain subset of warehouses from the set of warehouses 116A to 116H. The intermediate solution for each sub-problem may include the set of routes by which the set of vehicles 118A and 118B may transport the set of items to the corresponding subset of warehouses at a minimum cost. Each intermediate solution may be a partial solution of the optimization problem 508A and may include such set of routes associated with the corresponding subset of warehouses. For example, the sub-problem-1 516A may be solved to obtain an intermediate solution-1 518A, the sub-problem-2 516B may be solved to obtain an intermediate solution-2 518B, . . . and the sub-problem-N 516N may be solved to obtain an intermediate solution-N 518N. Each sub-problem of the set of sub-problems 516 may be solved either serially using a single annealer-based solver (such as, the annealer-based solver 102A) or in parallel using multiple annealer-based solvers (such as, the annealer-based solver 102A). In order to solve each sub-problem serially, the set of sub-problems 516 may be arranged in the queue and may be provided to the annealer-based solver 102A in a serial order. For example, the annealer-based solver 102A may first solve the sub-problem-1 516A to obtain the intermediate solution-1 518A. Further, the annealer-based solver 102A may solve the sub-problem-2 516B to obtain the intermediate solution-2 518B and so on, till the sub-problem-N 516N is solved. To solve the set of sub-problems 516 in parallel, the set of sub-problems 516 may be fed to the multiple annealer-based solvers at once. For example, N number of annealer-based solvers may be employed. A first annealer-based solver may solve the sub-problem-1 516A, a second annealer-based solver may solve the sub-problem-2 516B, and so on. Solution of the set of sub-problems 516 in parallel may require a multiple annealer-based solvers but the time taken to solve the set of sub-problems 516 may be reduced.

At 514, the intermediate solution combination operation may be executed. In the intermediate solution combination operation, the processor 204 may be configured to combine the intermediate solution associated with each of the set of sub-problems 516 to determine the final solution of the optimization problem 508A based on the received set of constraints (e.g., the constraints 506A). Herein, the determined final solution may be indicative of a set of optimal routes 520 to be assigned to the set of vehicles. As the final solution may be obtained based on a combination of the intermediate solutions 518 associated with each of the set of sub-problems 516, the final solution may be regarded as a complete solution of the VRP optimization problem. Such complete solution may correspond to the entire set of warehouses (e.g., the set of warehouses 116A to 116H). The final solution may indicate the set of optimal routes such that the set of vehicles 118A and 118B may transport the set of items between the set of warehouses 116A to 116H and the depot 114 at a minimum cost. Thus, the set of optimal routes 520 may include shortest possible routes that the set of vehicles 118A and 118B may take. With reference to FIG. 5B, the intermediate solution-1 518A, the intermediate solution-2 518B, . . . and the intermediate solution-N 518N may be combined to determine the final solution. The set of optimal routes 520 may include optimal routes such as, an optimal route-1 520A, an optimal route-2 520B, . . . and an optimal route-M 520M.

In an embodiment, the determination of the final solution may be further based on at least one of: the set of routes including the set of warehouses, a satisfaction of the set of constraints, and a minimization of the total cost associated with the set of optimal routes. With reference to FIG. 5B, once the intermediate solutions 518 may be determined, a subset of routes may be selected from the set of routes associated with each intermediate solution such that all constraints (e.g., demand constraints) may be satisfied and the total cost may also be minimized. For example, if the sets of routes associated with the intermediate solutions 518, include "$R_1$", "$R_2$", . . . "$R_k$", which may cover all warehouses of the set of warehouses, a subset of routes may be selected from the sets of routes to create the final solution. In other words, the processor 204 may select subsets $R'_i \subset R_i$ for i=1, k to create the final solution, subject to the satisfaction of all constraints (e.g., demand constraints) and the minimization of the total cost. The satisfaction of the set of constraints may guarantee that the selected subset of routes still satisfy the demands. Further, as the total cost may be minimized to select the subset of routes, the final solution, so obtained, may be an optimal solution, which may include the set of optimal routes.

To determine the final solution, a first demand constraint and a second demand constraint may be checked. Herein, the first demand constraint may ensure that a sum of an amount of loading/unloading of an item with an action type "a" for a warehouse "w" on a route "r" may be lesser than a demand at the warehouse "w" for all load/unload action types "a" for all selected subset of routes. The first demand constraint may be represented by an equation (25), as follows:

$$\Sigma_{R \in S}\Sigma_{r \in R}S_{R,r} \cdot r_{w,\alpha} \geq D_{w,\alpha}; \forall w,\alpha \in \{ua,ub,la,lb\} \quad (25)$$

where, "$S_{R,r}$" may represent a binary variable indicating whether a route "r", which is a partial solution of the complete sets of routes "R" is selected to be part of the final solution, "$r_{w,\alpha}$" may represent an amount of loading/unloading of the item with an action type "α" for a warehouse "w" on a route "r", and "$D_{w,\alpha}$" may represent a demand at warehouse "w" for a load or unload type action "α".

The second demand constraint may ensure that a sum of a binary variable indicating whether the loading action for warehouses are done in a route "r" such that the time satisfies the maximum loading time for all selected subset of routes may be greater than or equal to 1. The second demand constraint may be represented by an equation (26), as follows:

$$\Sigma_{R \in S}\Sigma_{r \in R}S_{R,r} \cdot r_{w,max} \geq 1; \forall w \quad (26)$$

In an embodiment, the optimization problem 508A may include a second objective function configured to minimize a summation of a total cost associated with each route included in the set of optimal routes 520. The minimization of the summation of the total cost associated with each route included in the set of optimal routes 520 may lead to a minimization an overall cost associated with the set of optimal routes 520. The second objective function may be represented by an equation (27), as follows:

$$OF_2 = \min \Sigma_{R \in S}\Sigma_{r \in R}S_{R,r} \cdot r\text{cost}(r) \quad (27)$$

where, "$OF_2$" may represent the second objective function,

"$S_{R,r}$" may represent a binary variable indicating whether a route "r" which is a partial solution of the complete sets of routes R may be selected to be part of the final solution, and "rcost(r)" may represent a total cost of a route "r". If the route "r" is selected to be part of the final solution, "$S_{R,r}$" is "1", else "$S_{R,r}$" may be "0". Thus, the second objective may minimize the sum of the total cost associated with each route included in the set of optimal routes 520 (i.e., including the optimal rout-1 520A, the optimal route-2 520B, the optimal route-3 520C, . . . and the optimal route-M 520M).

Figure 6:
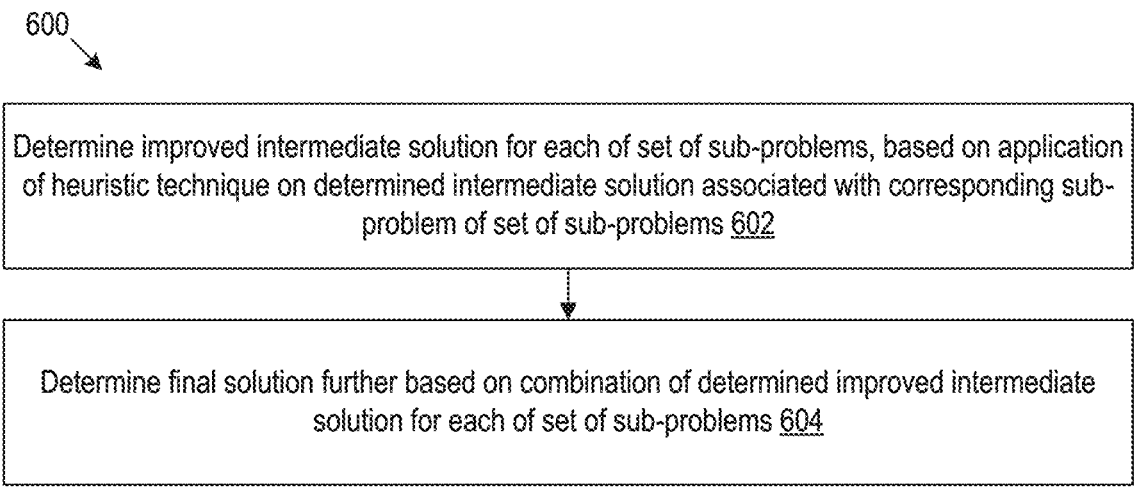
FIG. 6 is a diagram that illustrates a flowchart of an example method for determination of a final solution from an improved intermediate solution.

FIG. 6 is a diagram that illustrates a flowchart of an example method for determination of a final solution from an improved intermediate solution, in accordance with at least one embodiment described in the present disclosure. FIG. 6 is described in conjunction with elements from FIG. 1, FIG. 2, FIG. 3, FIG. 4, FIG. 5A, and FIG. 5B. With reference to FIG. 6, there is shown a flowchart 600. The method illustrated in the flowchart 600 may start at 602 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 600 may be divided into additional blocks, combined into fewer blocks, or eliminated, depending on the particular implementation.

At block 602, an improved intermediate solution for each of the set of sub-problems may be determined based on an application of a heuristic technique on the determined intermediate solution associated with the corresponding sub-problem of the set of sub-problems. In an embodiment, the processor 204 may be configured to determine the improved intermediate solution for each of the set of sub-problems based on the application of the heuristic technique on the determined intermediate solution associated with the corresponding sub-problem of the set of sub-problems. It may be appreciated that the heuristic technique may be an approach to solve an optimization problem such that the solutions so determined may not be guaranteed to be optimal. However, the heuristic technique may help to determine approximate optimal solutions in a lesser time using lesser computation resources than what may be required to obtain the optimal solutions. Once, intermediate solutions such as, the intermediate solutions 518 may be determined, the heuristic technique may be applied to improve the intermediate solutions 518. Such heuristic technique may be referred to as an improvement heuristic technique. Thus, the improvement heuristic techniques may help to refine the intermediate solutions 518. In an embodiment, the improvement heuristic technique may correspond to a large-neighborhood local-search technique that may be employed to improve the intermediate solutions such as, the intermediate solution 518. It may be appreciated that the large neighborhood local search may improve solutions based on a repeated transformation of a current solution to an improved solution in the neighborhood. In an example, the improvement heuristic techniques may employ a multi-route improvement heuristic technique that may improve the intermediate solutions 518 based on a selection of several routes corresponding to the intermediate solutions 518 at once to determine the improved intermediate solutions. The determination of the improved intermediate solution for each of the set of sub-problems is described further, for example, in FIG. 7.

At block 604, the final solution may be further determined based on a combination of the determined improved intermediate solution for each of the set of sub-problems. In an embodiment, the processor 204 may be configured to determine the final solution further based on the combination of the determined improved intermediate solution for each of the set of sub-problems. For example, with reference to FIG. 5B, an improved intermediate solution-1, improved intermediate solution-2, improved intermediate solution-3, . . . and an improved intermediate solution N may be determined for the sub-problem-1 516A, the sub-problem-2 516B, the sub-problem-3 516C, . . . and the sub-problem-N 516N, respectively, based on the application of the improvement heuristic technique on the intermediate solutions 518. The improved intermediate solution-1, the improved intermediate solution-2, the improved intermediate solution-3, . . . and the improved intermediate solution-N may be then combined to obtain the final solution. The final solution, so obtained, may be more accurate and the cost associated with the corresponding set of optimal routes may be further reduced.

Although the flowchart 600 is illustrated as discrete operations, such as 602 and 604. However, in certain embodiments, such discrete operations may be further divided into additional operations, combined into fewer operations, or eliminated, depending on the particular implementation without detracting from the essence of the disclosed embodiments.

Figure 7:
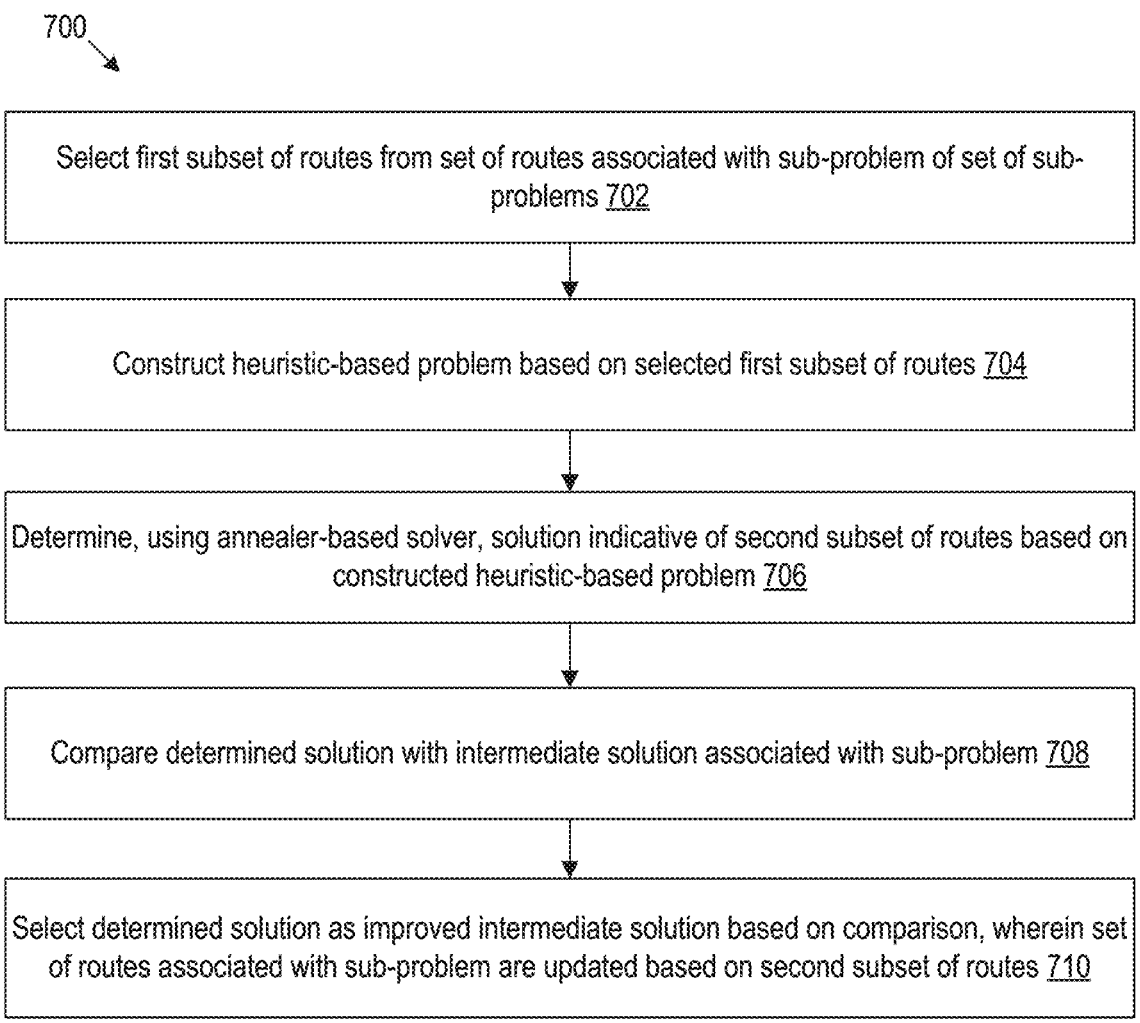
FIG. 7 is a diagram that illustrates flowchart of an example method for determination of an improved intermediate solution for each of a set of sub-problems.

FIG. 7 is a diagram that illustrates flowchart of an example method for determination of an improved intermediate solution for each of a set of sub-problems, in accordance with at least one embodiment described in the present disclosure. FIG. 7 is described in conjunction with elements from FIG. 1, FIG. 2, FIG. 3, FIG. 4, FIG. 5A, FIG. 5B, and FIG. 6. With reference to FIG. 7 there is shown a flowchart 700. The method illustrated in the flowchart 700 may start at 702 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 700 may be divided into additional blocks, combined into fewer blocks, or eliminated, depending on the particular implementation.

At block 702, a first subset of routes may be selected from the set of routes associated with a sub-problem of the set of sub-problems. In an embodiment, the processor 204 may be configured to select the first subset of routes from the set of routes associated with a sub-problem of the set of sub-problems. With reference to FIG. 5B, for example, a subset of routes may be selected as the first subset of routes from the set of routes obtained from the intermediate solution-1 518A associated with the sub-problem-1 516A. In an embodiment, a subset of warehouses from the set of warehouses 116A to 116H may be selected. For example, the subset of warehouses corresponding to the sub-problem-1 516A may be selected.

At block 704, a heuristic-based problem may be constructed based on the selected first subset of routes. In an embodiment, the processor 204 may be configured to construct the heuristic-based problem based on the selected first subset of routes. The heuristic-based problem may be constructed based on an objective function that may be configured to minimize the total cost associated with the selected first subset of routes. The objective function corresponding to the heuristic-based problem may be represented by an equation (28), as follows:

$$OF_h = \min \Sigma_r \text{cost}(u,o) x_{u,o,r} \qquad (28)$$

where, "$OF_h$" may represent the objective function corresponding to the heuristic-based problem, "cost(u,o)" may represent a cost of an operation of the vehicle type "u" for an operation time "o", and "$x_{u,o,r}$" may represent a binary variable indicating whether the vehicle type "u" with an operation time "o" is assigned to a route "r". Herein, the route "r" may be included in the first subset of routes.

At block 706, a solution indicative of a second subset of routes may be determined using the annealer-based solver 102A, based on the constructed heuristic-based problem. In an embodiment, the processor 204 may be configured to determine, using the annealer-based solver 102A, the solution indicative of the second subset of routes, based on the constructed heuristic-based problem. Herein, the heuristic-based problem may be solved based on heuristic algorithms such as, a nearest-neighbor (NN) algorithm (also known as a greedy algorithm). For example, a first location may be randomly chosen in the first subset of routes. Further, a closest location to the first location may found and may be set as a second location. Similarly, other locations may be analyzed, and other close locations may be determined to create the second subset of routes.

At block 708, the determined solution may be compared with the intermediate solution associated with of the sub-problem. In an embodiment, the processor 204 may be configured to compare the determined solution with the intermediate solution associated with the sub-problem. For example, the first subset of routes may be selected from the set of routes of the intermediate solution-1 518A associated with the sub-problem-1 516A and the heuristic-based problem may be constructed based on the selected first subset of routes. The heuristic-based problem may be solved to determine the solution indicative of the second subset of routes. The total cost associated with each of the selected first subset of routes and the second subset of routes may be determined and compared. If the total cost associated with the selected first subset of routes is greater than the second subset of routes, the second subset of routes may be more optimal.

At block 710, the determined solution may be selected as the improved intermediate solution based on the comparison. Herein, the set of routes associated with sub-problem may be updated based on the second subset of routes. In an embodiment, the processor 204 may be configured to select the determined solution as the improved intermediate solution based on the comparison. Herein, if the total cost associated with the selected first subset of routes is greater than the second subset of routes, then the second subset of routes may be better. In such case, the second subset of routes may be replaced by the first subset of routes in the intermediate solution in order to obtain the improved intermediate solution. However, if the total cost associated with the selected first subset of routes is lesser than the second subset of routes, then the second subset of routes may not be better. In such case, the second subset of routes may be discarded. Operations related to blocks 702 to 710 may be repeated for a number of times, say "N" times, in order to improve the intermediate solution. The number of times "N" may be considered as a predefined number, such as, 100, 1000, and so on. The higher the number "N", better the improved intermediate solution may be.

Although the flowchart 700 is illustrated as discrete operations, such as 702, 704, 706, 708, and 710. However, in certain embodiments, such discrete operations may be further divided into additional operations, combined into fewer operations, or eliminated, depending on the particular implementation without detracting from the essence of the disclosed embodiments.

Figure 8:
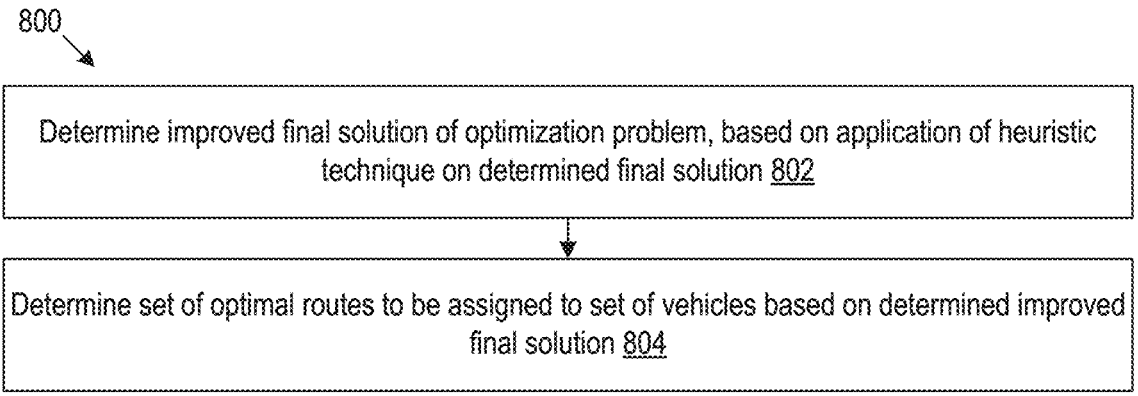
FIG. 8 is a diagram that illustrates a flowchart of an example method for a determination of an improved final solution of an optimization problem.

FIG. 8 is a diagram that illustrates a flowchart of an example method for a determination of an improved final solution of an optimization problem, in accordance with at least one embodiment described in the present disclosure. FIG. 8 is described in conjunction with elements from FIG. 1, FIG. 2, FIG. 3, FIG. 4, FIG. 5A, FIG. 5B, FIG. 6, and FIG. 7. With reference to FIG. 8, there is shown a flowchart 800. The method illustrated in the flowchart 800 may start at 802 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 800 may be divided into additional blocks, combined into fewer blocks, or eliminated, depending on the particular implementation.

At block 802, an improved final solution of the optimization problem may be determined based on an application of a heuristic technique on the determined final solution. In an embodiment, the processor 204 may be configured to determine the improved final solution of the optimization problem based on the application of the heuristic technique on the determined final solution. It may be appreciated that the heuristic technique may be an approach to solve an optimization problem such that solutions so determined may not be guaranteed to be optimal. However, the heuristic technique may help to determine approximate optimal solutions in a lesser time using lesser computation resources that may be required to obtain the optimal solutions. Once, the final solution is determined, the heuristic technique may be applied to further improve the final solution. Such heuristic technique may be referred to as an improvement heuristic technique. The improvement heuristic technique may lead to a refinement of the final solution such that a summation of a total cost associated with each route included in the set of optimal routes corresponding to the final solution may be reduced further. In an embodiment, the large-neighborhood local-search technique may be employed to improve the final solution. It may be appreciated that the large-neighborhood local-search technique may improve the final solution based on a repeated transformation of the final solution to an improved final solution in the neighborhood. In an example, the improvement heuristic techniques may employ a multi-route improvement heuristic technique that may improve the final solution by taking several routes of the final solutions at once to determine the improved final solution. The determination of the improved final solution is described further, for example, in FIG. 9.

At block 804, the set of optimal routes to be assigned to the set of vehicles may be determined, based on the improved final solution. In an embodiment, the processor 204 may be configured to determine the set of optimal routes to be assigned to the set of vehicles, based on the improved final solution. For example, referring to FIG. 5B, an improved optimal solution-1, an improved optimal solution-2, an improved optimal solution-3, . . . and an improved optimal solution-M may be determined for an optimal solution-1, an optimal solution-2, an optimal solution-3, . . . and an optimal solution-M, respectively based on an application of the improvement heuristic technique on the final solution. The improved final solution may include the improved optimal solution-1, the improved optimal solution-2, the improved optimal solution-3, . . . and the improved optimal solution-M. The improved final solution may correspond to the set of optimal routes 520. The improved final solution, so obtained, may be more accurate and the summation of the total cost associated with each route included in the set of optimal routes corresponding to the improved final solution may be reduced.

Although the flowchart 800 is illustrated as discrete operations, such as 802 and 804. However, in certain embodiments, such discrete operations may be further divided into additional operations, combined into fewer operations, or eliminated, depending on the particular implementation without detracting from the essence of the disclosed embodiments.

Figure 9:
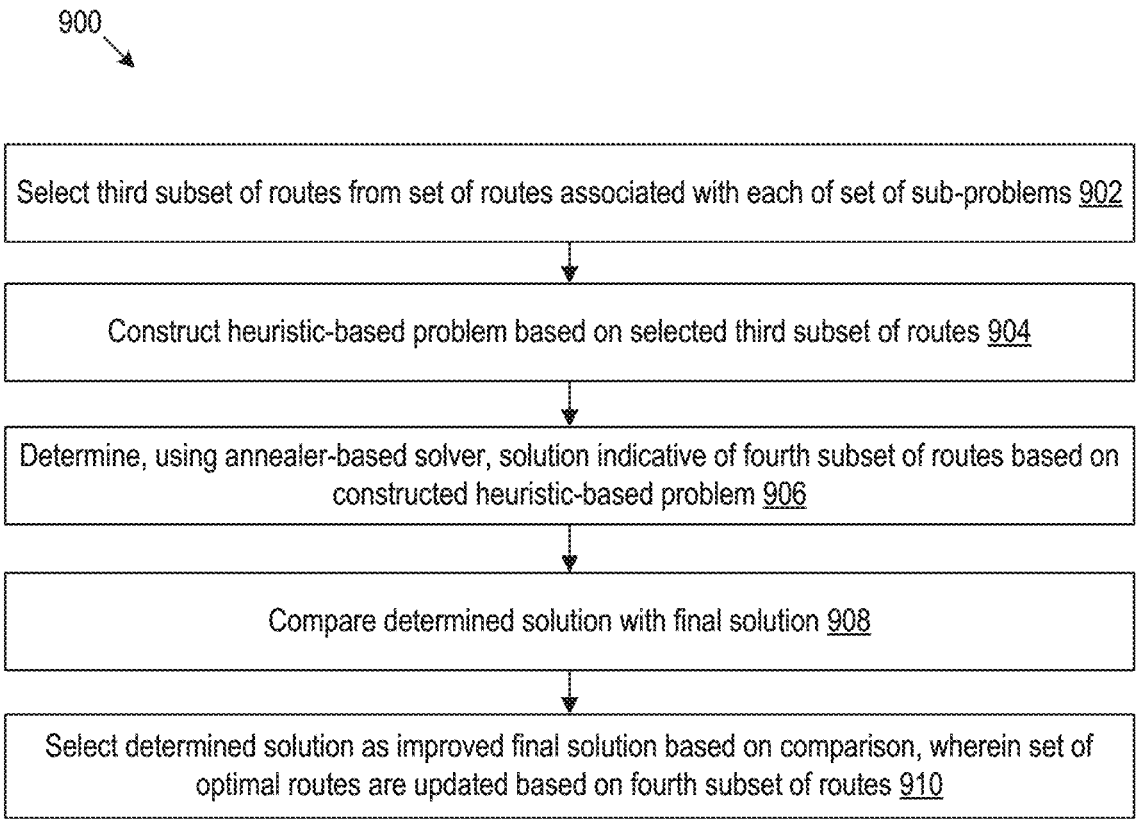
FIG. 9 is a diagram that illustrates a flowchart of an example method for determination of the improved final solution.

FIG. 9 is a diagram that illustrates a flowchart of an example method for determination of the improved final solution, in accordance with at least one embodiment described in the present disclosure. FIG. 9 is described in conjunction with elements from FIG. 1, FIG. 2, FIG. 3, FIG. 4, FIG. 5A, FIG. 5B, FIG. 6, FIG. 7, and FIG. 8. With reference to FIG. 9 there is shown a flowchart 900. The method illustrated in the flowchart 900 may start at 902 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 900 may be divided into additional blocks, combined into fewer blocks, or eliminated, depending on the particular implementation.

At block 902, a third subset of routes may be selected from the set of routes associated with each of the set of sub-problems. In an embodiment, the processor 204 may be configured to select the third subset of routes from the set of routes associated with each of the set of sub-problems. With reference to FIG. 5B, for example, the third subset of routes may be selected from the set of optimal routes 520 associated with the final solution. In another example, the third subset of routes may be selected from the set of routes corresponding to each intermediate solution from the intermediate solutions 518. In an embodiment, a subset of warehouses may be selected from the set of warehouses 116A to 116H. For example, the subset of warehouses corresponding to the optimal route-1 520A may be selected.

At block 904, a heuristic-based problem may be constructed based on the selected third subset of routes. In an embodiment, the processor 204 may be configured to construct the heuristic-based problem based on the selected third subset of routes. The constructed heuristic-based problem may include an objective function that may be configured to minimize a summation of the total cost associated with each route included in the selected third subset of routes corresponding to the final solution.

At block 906, a solution indicative of a fourth subset of routes may be determined, using the annealer-based solver 102A, based on the constructed heuristic-based problem. In an embodiment, the processor 204 may be configured to determine, using the annealer-based solver 102A, the solution indicative of the fourth subset of routes, based on the constructed heuristic-based problem. Herein, the heuristic-based problem may be solved by heuristic algorithms such as, a nearest-neighbor (NN) algorithm (also known as a greedy algorithm). For example, a first location may be randomly selected in the third subset of routes. Next, a closest location to the first location may found and may be set as a second location. Similarly, other locations may be analyzed, and other close locations may be determined to create the fourth subset of routes.

At block 908, the determined solution may be compared with the final solution. In an embodiment, the processor 204 may be configured to compare the determined solution with the final solution. For example, the third set subset of routes (such as, the optimal route-1 520A) may be selected from the set of optimal routes 520 associated with the final solution and the heuristic-based problem may be constructed based on the selected third subset of routes. The heuristic-based problem may be solved to determine the solution indicative of the third subset of routes. The total cost associated with each of the selected third subset of routes and the fourth subset of routes may be determined and compared. If the total cost associated with the selected third subset of routes is greater than the fourth subset of routes, the fourth subset of routes may be more optimal.

At block 910, the determined solution may be selected as the improved final solution based on the comparison. Herein, the set of optimal routes may be updated based on the fourth subset of routes. In an embodiment, the processor 204 may be configured to select the determined solution as the improved final solution based on the comparison. Herein, if the total cost associated with the selected second subset of routes is greater than the fourth subset of routes, then the fourth subset of routes may be better. In such case, the fourth subset of routes may be replaced by the third subset of routes in the final solution in order to obtain the improved final solution. However, if the total cost associated with the selected third subset of routes is lesser than the fourth subset of routes, then the fourth subset of routes may not be better. In such case, the fourth subset of routes may be discarded. Operations related to blocks 902 to 910 may be repeated for a number of times, say N times, in order to improve the final solution. The number of times "N" may be considered as a predefined number, such as, 100, 1000, and so on. The higher the number "N", better the improved final solution may be.

Although the flowchart 900 is illustrated as discrete operations, such as 902, 904, 906, 908, and 910. However, in certain embodiments, such discrete operations may be further divided into additional operations, combined into fewer operations, or eliminated, depending on the particular implementation without detracting from the essence of the disclosed embodiments.

Figures 10A, 10B:
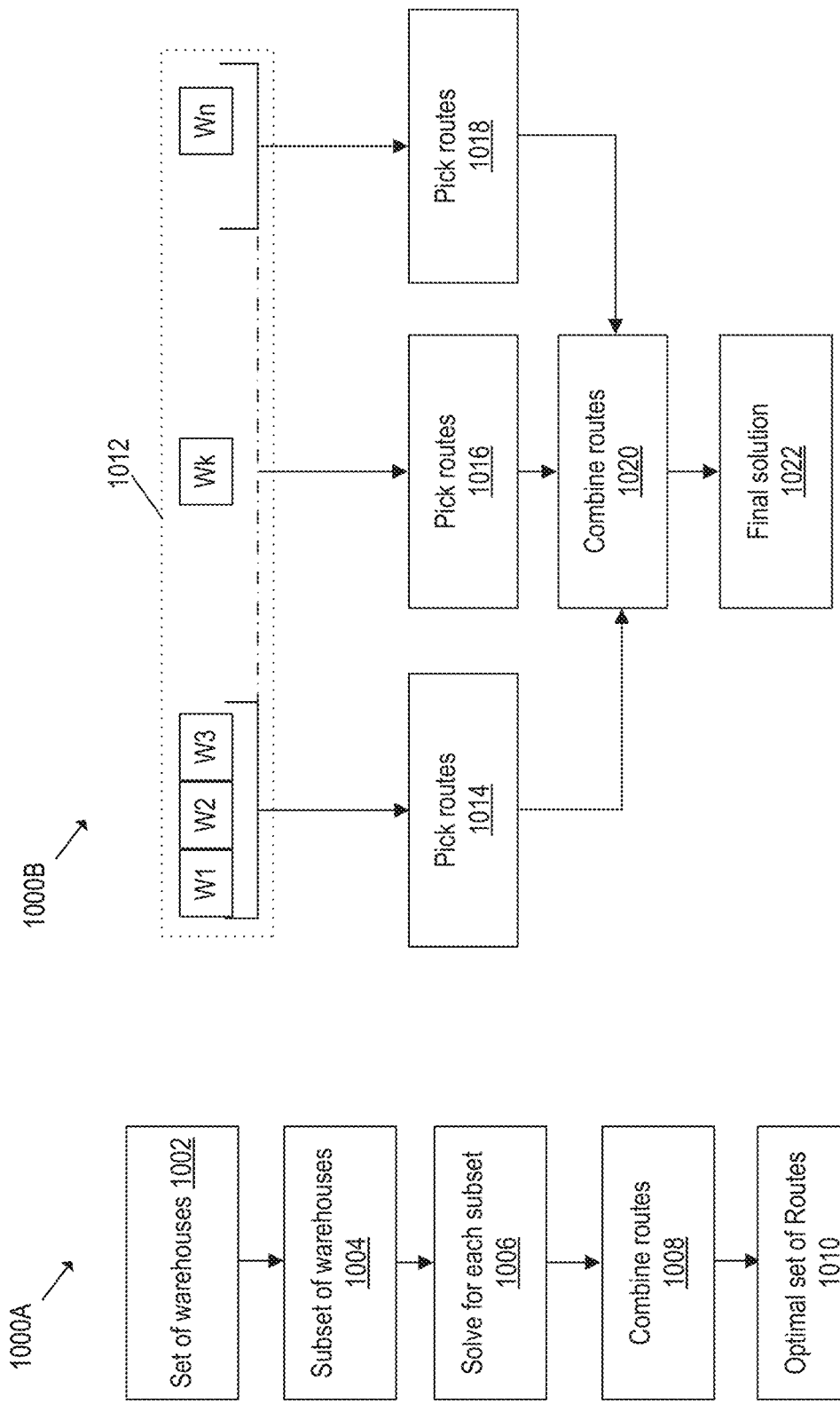
FIGS. 10A and 10B, collectively illustrate an exemplary scenario of a determination of a set of optimal routes associated with a vehicle routing problem.

FIGS. 10A and 10B, collectively illustrate an exemplary scenario of a determination of a set of optimal routes associated with a vehicle routing problem, in accordance with at least one embodiment described in the present disclosure. FIGS. 10A and 10B are described in conjunction with elements from FIG. 1, FIG. 2, FIG. 3, FIG. 4, FIG. 5A, FIG. 5B, FIG. 6, FIG. 7, FIG. 8, and FIG. 9. With reference to FIGS. 10A and 10B, there are shown exemplary scenarios 1000A and 1000B. The scenario 1000A may include a set of warehouses 1002, a subset of warehouses 1004, a final set of routes 1010. The scenario 1000A may further include operations such as, an operation to solve for each subset (denoted by 1006), and an operation to combine routes (denoted by 1008). The scenario 1000B may include a set of warehouses 1012 and a final solution 1022. The scenario 1000B may further include operations such as, operations to pick routes (such as, operations 1014, 1016, and 1018), and an operation to combine routes (denoted by 1020).

With reference to FIG. 10A, the set of warehouses 1002, such as, the set of warehouses 116A to 116H may include the warehouses that the set of vehicles 118A and 118B may need to visit to transport items between the depot 114 and the warehouses. It may be appreciated that each warehouse of the set of warehouses 1002 may have a demand of one or more first items such as, raw materials (that may be unloaded to the warehouse) or may be able to supply one or more second items (that may be loaded from the warehouse). In any case the set of vehicles 118A and 118B may need to visit the corresponding warehouse in order to perform the loading or unloading action type. Thus, the set of warehouses 1002 may include the warehouses for which the action type may need to be performed.

It may be appreciated that the number of warehouses in the VRP may be quite large. Hence, the VRP may be computationally complex, and hence, complex, and expensive hardware may be required to solve the VRP. Moreover, due to the complexity of the vehicle routing problem a significant amount of computation time may be required to obtain a satisfactory solution. In order to mitigate aforesaid problems associated with the VRP, the VRP optimization problem may be divided into the set of sub-problems based on a selection of the subset of warehouses 1004 from the set of warehouses 1002. For example, if the set of warehouses includes 1000 warehouses, then the VRP may be divided into 10 sub-problems where each sub-problem may include 100 warehouses. The division of the VRP into the set of sub-problems help to handle the complexity of the VRP. Complexity of each sub-problem may be lesser than the overall optimization problem, and hence, an individual sub-problem may be solved using inexpensive hardware and in a lesser amount of time.

At the operation 1006, a sub-problem associated with each subset of warehouses (from the subset of warehouses 1004) may be solved using the annealer-based solver 102A to determine the intermediate solution for the corresponding sub-problem. The intermediate solution for the corresponding subset of warehouses may include the set of routes by which the set of vehicles 118A and 1188 may transport the set of items to the corresponding subset of warehouses at a minimum cost. Each subset of warehouses of the set of subset of warehouses 1004 may be solved either serially using a single annealer-based solver (e.g., the annealer-based solver 102A) or in parallel using multiple annealer-based solvers (such as, the annealer-based solver 102A). In order to solve each subset of warehouses serially, the set of subset of warehouses 1004 may be arranged in a queue and may be provided to the annealer-based solver 102A in a serial order. To solve the set of subsets of warehouses in parallel, the subset of warehouses 1004 may be fed to the multiple annealer-based solvers at once. The parallel solution of the set of sub-problems may thus need a greater number of annealer-based solvers but may require significantly lesser computational time than the serial solution of the set of sub-problems. It may be noted that the intermediate solution associated with each of the subset of warehouses may be a partial solution and may not be a complete solution of the VRP optimization problem.

At the operation 1008, the set of routes associated with each sub-problem of the set of sub-problems may be combined to obtain the final solution including the optimal set of routes 1010. As the final solution may be obtained based on a combination of the intermediate solution associated with each of the set of sub-problems, the final solution may be regarded as a complete solution of the VRP optimization problem. The final solution may indicate the set of optimal routes 1010 such that the set of vehicles 118A and 118B may transport the set of items between the set of warehouses 116A to 116H and the depot 114 at a minimum cost. Thus, the optimal set of routes 1010 may include shortest possible routes that the set of vehicles 118A and 118B may take. For example, if the set of sub-problems includes a first sub-problem, a second sub-problem, and a third sub-problem, the intermediate solution of each sub-problem may be combined in order to obtain the final solution.

For example, with reference to FIG. 10B, the set of warehouses 1012 may include "N" number of warehouses. The set of warehouses 1012 may be divided into subsets of warehouses, where each subset of warehouses may include any three warehouses from the set of warehouses 1012. For example, a subset of warehouse may include a warehouse $w_1$, a warehouse $w_2$, and a warehouse $w_3$. Each warehouse of a subset of warehouses may correspond to a certain sub-problem. The set of sub-problems may be created based on the set of warehouses, wherein each sub-problem may include a subset of warehouses. Each of the set of sub-problems may be solved to determine the corresponding intermediate solution based on a selection of a set of routes associated with the corresponding subset of warehouses. For example, at the operations 1014, 1016, and 1018 corresponding intermediate solutions for the set of sub-problems may be determined based on a selection of a set of routes associated with the corresponding subset of warehouses. At the operation 1020, the set of routes associated with each sub-problem of the set of sub-problems may be combined to determine the final solution 1022. The final solution 1022 may be indicative of the set of optimal routes to be assigned to the set of vehicles. As the final solution 1022 may be obtained based on a combination of the intermediate solution associated with each of the set of sub-problems, the final solution 1022 may be regarded as a complete solution of the VRP optimization problem. The final solution 1022 may correspond to the set of optimal routes 520 such that the set of vehicles 118A and 118B may transport the set of items between the set of warehouses 116A to 116H and the depot 114 at a minimum cost. Thus, the set of optimal routes 520 may include shortest possible routes that the set of vehicles 118A and 118B may take. The set of optimal routes 520 may also require the shortest amount of time to travel between the depot 114 and the set of warehouses 116A to 116H.

Figure 11:
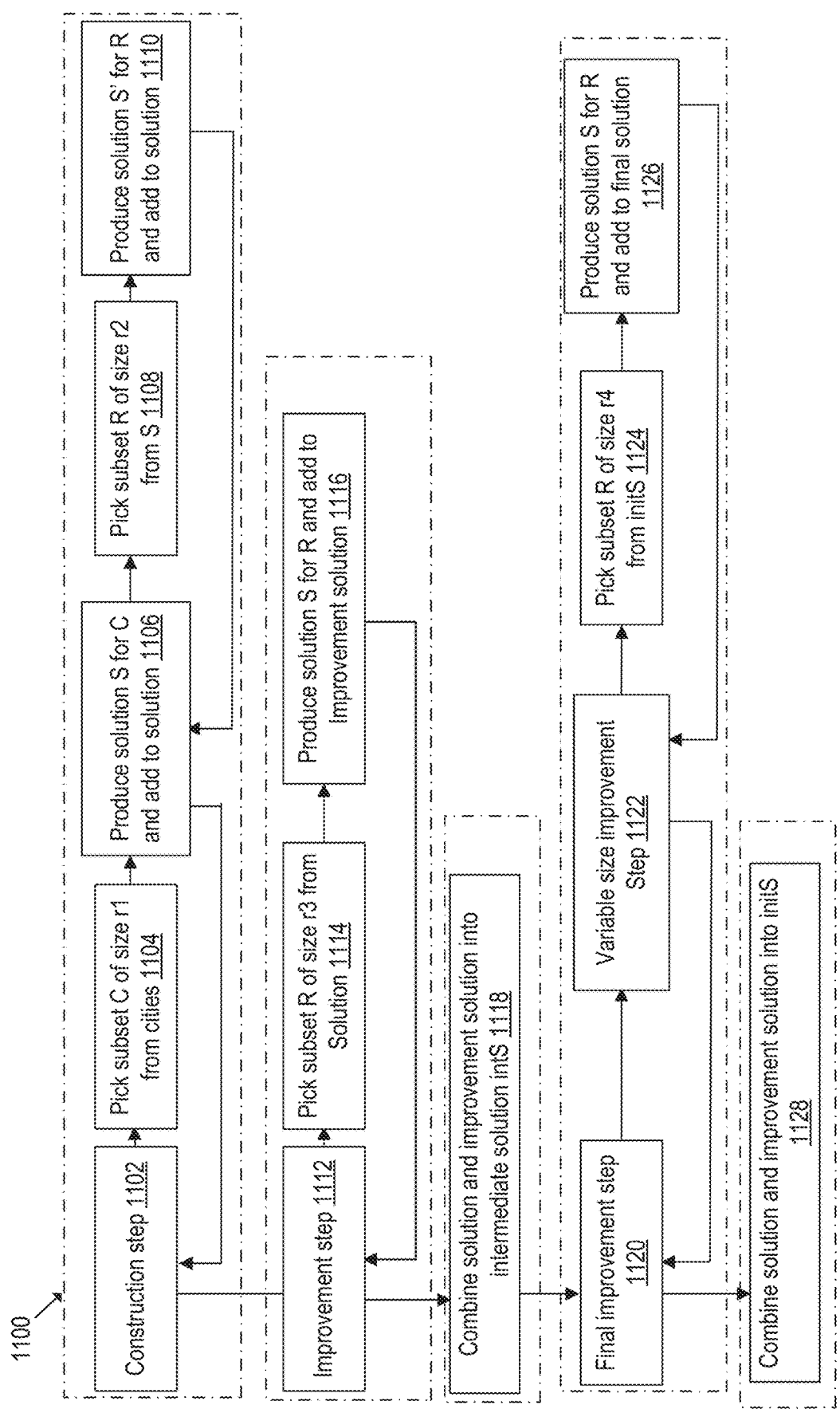
FIG. 11 is a block diagram that illustrates a determination of a set of optimal routes associated with a vehicle routing problem.

FIG. 11 is a block diagram that illustrates a determination of a set of optimal routes associated with a vehicle routing problem, in accordance with at least one embodiment described in the present disclosure. FIG. 11 is described in conjunction with elements from FIG. 1, FIG. 2, FIG. 3, FIG. 4, FIG. 5A, FIG. 5B, FIG. 6, FIG. 7, FIG. 8, FIG. 9, FIG. 10A, and FIG. 10B. With reference to FIG. 11, there is shown block diagram 1100. The block diagram 1100 may include a set of operations that may be executed by one or more components of FIG. 1, such as, the electronic device 102. The operations may include 1102, 1104, 1106, 1108, 1110, 1112, 1114, 1116, 1118, 1120, 1122, 1124, 1126, and 1128. The set of operations may be performed by the electronic device 102 to solve the vehicle routing problem (VRP) using annealer-based solvers (such as, the annealer-based solver 102A), as described herein.

In an embodiment, the processor 204 may be configured to select a first subset of locations from a set of locations associated with a first sub-problem of the set of sub-problems. The processor 204 may be further configured to control an execution of a first set of operations to solve the first sub-problem using the annealer-based solver 102A. Herein, the first set of operations may include determining a first partial solution associated with the first sub-problem for the selected first subset of locations, adding the first partial solution to an initial solution associated with the first sub-problem, and re-selecting a second subset of locations from the set of locations, as the selected first subset of locations. The processor 204 may be further configured to obtain the intermediate solution associated with the first sub-problem from the initial solution based on an iterative execution of the first set of operations for a first predetermined number of iterations, as described next herein.

At block 1102, a construction step may be executed. In the construction step, the processor 204 may construct the optimization problem 508A based on the received set of constraints (such as, the constraints 506A). The optimization problem 508A may be a function of the set of constraints, and the goal of the optimization problem 508A is to determine the set of optimal routes for the vehicle routing problem. A variation in the set of constraints may result in the construction of a new vehicle routing problem. Hence, based on the received set of constraints, the processor 204 may construct the vehicle routing problem.

In the construction step, the processor 204 may further divide the constructed optimization problem 508A into the set of sub-problems 516, where each of the set of sub-problems 516 may correspond to the subset of warehouses of the set of warehouses 116A to 116H. It may be appreciated that the vehicle routing problem may be computationally expensive due to a large number of warehouses, constraints, decision variables, and parameters. Hence, the solution of the VRP may need complex hardware. Moreover, due to the complexity of the vehicle routing problem, a significant computation time may be required to obtain a satisfactory solution of the VRP. In order to mitigate aforesaid problems associated with the VRP, the VRP may be divided into the set of sub-problems 516. Herein, each sub-problem may correspond to the subset of warehouses.

At block 1104, an operation to pick a subset of cities "C" of a size "r1" (i.e., count of the subset) from cities may be performed. As discussed, the processor 204 may divide the optimization problem (such as, the optimization problem 508A) into set of sub-problems 516. Each of the set of sub-problems 516 may be associated with a set of locations. Herein, locations may include warehouses, depots, cities, and the like, that the set of vehicles 118A and 118B may need to visit. The processor 204 may select the first subset of locations from the set of locations associated with the first sub-problem of the set of sub-problems. In an example, the optimization problem 508A may need to determine the set of optimal routes for a vehicle routing problem that includes 10000 cities. Herein, the processor 204 may be configured to divide the optimization problem into set of sub-problems, where each sub-problem may include 1000 cities. For example, a first sub-problem may be associated with a first set of 1000 cities out of the 10000 cities associated with the VRP. The processor 204 may select the first subset of locations from the set of locations associated with the first sub-problem of the set of sub-problems. For example, out of the 1000 cities associated with the first sub-problem, the processor 204 may be configured to select 100 cities, as the first subset of locations. Herein, the first subset of locations may be represented by "C" and size "r1" of the first subset of locations "C" may be 100. An initial solution may be determined for the first sub-problem and the initial solution may be continuously updated till the first sub-problem may be solved.

At 1106, an operation to produce a solution "S" for the first subset of locations "C" and an operation to add the produced solution "S" to an initial solution of the constructed optimization may be executed. Herein, the processor 204 may be configured to control execution of the first set of operations to solve the first sub-problem using the annealer-based solver 102A. The first set of operations may include steps to solve the first sub-problem. The first set of operations may determine the first partial solution associated with the first sub-problem for the selected first subset of locations by solving an optimization problem associated with the selected first subset of locations by using the annealer-based solver 102A. Herein, the first partial solution may include a first set of routes to visit the first subset of locations at a minimum cost. The first set of routes may be the shortest routes that may cover each location of the first subset of locations at least once. It may be noted that since the first subset of locations may include only "r1" cities (say, 100 cities out of the 10000 cities present in the complete VRP optimization problem), a computational complexity of an optimization problem associated with the selected first subset of locations may be reduced, and hence, may be solved within a short time duration. With reference to FIG. 11, the first partial solution "S" may be obtained for the first subset of locations "C" of size "r1". That is, the first partial solution "S" may correspond to the 100 cities of the first subset of locations "C".

The first set of operations may include an addition of the first partial solution to the initial solution associated with the first sub-problem. The initial solution may be an initial set of routes associated with the first sub-problem and may be continuously updated as the first sub-problem may be solved. Once, the first partial solution "S" corresponding to the first subset of locations C of size "r1" may be obtained, the first partial solution "S" may be added to the initial solution in order to update the initial solution. That is, the first partial solution "S" corresponding to the 100 cities of the first subset of locations "C" may be added to the initial solution.

The first set of operations may include a re-selection of the second subset of locations from the set of locations, as the selected first subset of locations. For example, the second subset of locations may include next 100 cities out of 1000 cities present in the set of locations. The second subset of locations may be assigned as the first subset of locations and operations pertaining to the block 1102, the block 1104, and the block 1106 may be repeated till the first sub-problem may be solved for all subsets of locations from the set of locations corresponding to the first sub-problem.

The processor 204 may obtain the intermediate solution associated with the first sub-problem from the initial solution based on an iterative execution of the first set of operations for a first predetermined number of iterations. The intermediate solution associated may be the solution of the first sub-problem and may include the set of routes associated with the first sub-problem of the set of sub-problems. The intermediate solution may be the initial solution obtained by execution of the operations pertaining to the block 1102, the block 1104, and the block 1106 for the first predetermined number of iterations. The first predetermined number of iterations may be selected by the user based on experience of the user, time duration that the user may have to solve the VRP, and the like. The first predetermined number of iterations may be changed based on the initial solution that may be obtained after the execution of the operations pertaining to the block 1102, the block 1104, and the block 1106 for the first predetermined number of iterations. For example, if the initial solution obtained after the first predetermined number of iterations is not optimal, the first predetermined number of iterations may be increased to a larger number to obtain a better initial solution. Once the operations pertaining to the block 1102, the block 1104, and the block 1106 have been executed for the first predetermined number of iterations, the initial solution, so determined, may correspond to the intermediate solution for the first sub-problem. For example, if the set of locations corresponding to the first sub-problem include 1000 cities, and the first subset of locations includes 100 cities, the operations pertaining to the block 1102, the block 1104, and the block 1106 may be repeated 10 times so that the first sub-problem may be solved for all subset of locations corresponding to the set of location. The initial solution obtained after the $10^{th}$ iteration may be referred to as the intermediate solution, in such case.

In an embodiment, the processor 204 may be further configured to select a first subset of routes based on the initial solution associated with the first sub-problem and control an execution of a second set of operations to solve the first sub-problem using the annealer-based solver 102A. Herein, the second set of operations may include determining a second partial solution associated with the first sub-problem for the selected first subset of routes. The second set of operations may further include adding the second partial solution to the initial solution associated with the first sub-problem. The second set of operations may further include re-selecting a second subset of routes based on the initial solution, as the selected first subset of routes. The processor 204 may be further configured to obtain the intermediate solution associated with the first sub-problem from the initial solution based on an iterative execution of the second set of operations for a second predetermined number of iterations, as described next herein.

At block 1108, an operation to pick a subset of routes "R" of size "r2" from the first partial solution "S" (or the initial solution) may be executed. The processor 204 may select the first subset of routes based on the initial solution associated with the first sub-problem. For example, the first sub-problem may be associated with 1000 cities out of the 10000 cities associated with the VRP. The processor 204 may select 100 cities as the first subset of locations from the set of 1000 cities of the first sub-problem. Herein, the first subset of locations may be represented by "C" and size "r1" of the first subset of locations "C" may be 100. The first set of operations may be executed on the first subset of locations to obtain the initial solution that may include certain routes associated with the first subset of locations. For example, the initial solution "S" may be 50 routes. The processor 204 may select the first subset of routes "R" including 10 routes from the 50 routes associated with the first subset of location. Thus, size of "R" routes represented by "r2" may be 10. In an embodiment, the first subset of routes may be selected randomly.

At 1110, an operation to produce a solution "S" for the first subset of routes "R" and an operation to add to the solution "S" to the first partial solution "S" may be executed. Herein, the processor 204 may be configured to control the execution of the second set of operations to solve the first sub-problem using the annealer-based solver 102A. The second set of operations may include steps to solve the first sub-problem for the first subset of routes "R". The second set of operations may include a determination of the second partial solution associated with the first sub-problem for the selected first subset of routes. The second partial solution may be a set of routes required to the visit the first subset of routes "R" at a minimum cost. The set of routes corresponding to the second partial solution may be shortest routes that may cover each location of the first subset of routes "R". With reference, to FIG. 11, the second partial solution S' may be obtained for the first subset of routes "R" of size "r2".

The second set of operations may further include an addition of the second partial solution S' to the initial solution S associated with the first sub-problem. For example, as discussed, the initial solution "S" may include 50 routes. The processor 204 may select the first subset of routes "R" including 10 routes from the 50 routes associated with the first subset of location. Thus, size of "R" routes represented by "r2" may be 10. The processor 204 may then perform the second set of operations to obtain the second partial solution "S'" associated with the first sub-problem for the selected first subset of routes "R". Herein, the first sub-problem may be solved for the 10 routes associated with the first subset of routes "R" to determine the second partial solution "S'". The second partial solution "S'" may be added to the first partial solution "S" (determined at block 1106), which may be ultimately added to the initial solution to obtain the intermediate solution associated with the first sub-problem.

The first set of operations may include a re-selection of the second subset of routes based on the initial solution, as the selected first subset of routes. For example, the second subset of routes may include the next 10 routes out of 50 routes associated with the set of routes of the first sub-problem. The second subset of routes may be assigned as the first subset of routes and operations pertaining to the block 1106, the block 1108, and the block 1110 may be repeated till the first sub-problem may be solved for all subsets of routes from the set of routes corresponding to the first sub-problem.

The processor 204 may obtain the intermediate solution associated with the first sub-problem from the initial solution further based on an iterative execution of the second set of operations for a second predetermined number of iterations. The intermediate solution associated may be a solution of the first sub-problem and may include the set of routes associated with the first sub-problem of the set of sub-problems. The intermediate solution may be the initial solution obtained by execution of the operations pertaining to the block 1102, the block 1104, and the block 1106 for the first predetermined number of iterations and by executing the operations pertaining to the block 1106, the block 1108, and the block 1110 for the second predetermined number of iterations. The second predetermined number of iterations may be selected by the user based on experience of the user, time duration that the user may have to solve the VRP, and the like. The second predetermined number of iterations may be changed based on the initial solution that may be obtained after the execution of operations pertaining to the block 1106, the block 1108, and the block 1110 for the second predetermined number of iterations. For example, if the initial solution, so obtained, after execution of the second predetermined number of iterations is not optimal, the second predetermined number of iterations may be increased to a larger number so that a better initial solution may be obtained. After the operations pertaining to the block 1106, the block 1108, and the block 1110 have been executed for the second predetermined number of iterations, the initial solution may correspond to the intermediate solution for the first sub-problem. The intermediate solutions for each sub-problem of the set of sub-problem may be determined in a manner similar to the determination of the intermediate solution for the first sub-problem.

At 1112, an improvement step may be executed. Herein, the heuristic technique may be applied to improve the intermediate solutions as obtained from the construction step 1102. Such heuristic technique may be referred to as the improvement heuristic technique and may be used to improve the intermediate solution pertaining to each sub-problem of the set of sub-problem. For example, if 10 intermediate solutions have been obtained, one each for a set of 10 sub-problems, the intermediate solution corresponding to each sub-problem may be improved by using the improvement heuristic techniques.

At 1114, an operation to pick a subset "R" of size "r13" from each intermediate solution may be executed. For example, a subset of locations "R" from the intermediate solution corresponding to the first sub-problem may be selected. The selection of the subset of locations may be performed randomly or based on a user input. The improvement heuristic may be applied to improve the intermediate solution. The improvement heuristic techniques may help to refine the intermediate solutions. In an embodiment, the large-neighborhood local-search technique may be employed to improve the intermediate solutions such as, the intermediate solutions 518. It may be appreciated that the large-neighborhood local-search may improve solutions based on a repeated transformation of a current solution to the improved solution in the neighborhood. In an example, the improvement heuristic techniques may employ the multi-route improvement heuristic technique that may improve the intermediate solutions by taking several routes of the intermediate solutions at once to determine the intermediate solutions.

At block 1116, an operation to produce a solution "S" for routes "R" and an operation to add the produced solution "S" to the improvement solution may be executed. The improvement heuristics may determine a solution for a subset of routes "R" from the intermediate solution corresponding to the first sub-problem. The determined solution "S" may be further added to the improvement solution and the process may be continued till the improvement solution so obtained may be optimal.

At block 1118, an operation to combine solution and improvement solution into an intermediate solution "intS" may be executed. For example, if the intermediate solution pertaining to the first sub-problem is improved by using the improvement heuristics technique to obtain the improvement solution, the intermediate solution corresponding to first sub-problem may be replaced by the improvement solution. Next, the intermediate solution (and/or the improvement solution) corresponding to each sub-problem of the set of sub-problems may be combined to determine the final solution. Details of determination of the final solution have been provided, for example, at 514 of FIG. 5B.

At block 1120, a final improvement step may be executed. Herein, the final solution comprising the set of optimal routes 520 may be improved further by employing the improvement heuristic techniques. Details of improving the final solution have been provided, for example, in FIGS. 8 and 9.

At block 1122, a variable size improvement step may be executed. It may be noted that the annealer-based solvers such as, the annealer-based solver 102A, may be of variable hardware size. In other words, the annealer-based solvers may be constrained such that the annealer-based solvers may only handle a fixed number of variables, such as the decision variables. The number of variables that may be handled by the annealer-based solvers may be tunable. Hence, the improvement of the final solution may be bound by the hardware size of the annealer-based solvers. Thus, according to the size of the annealer-based solver 102A, the number of variables may be selected for improvement.

At block 1124, an operation to pick a subset "R" of size "r4" from the initial solution "intiS" may be performed. Herein, the initial solution may correspond to the final solution obtained after the combination of the intermediate solution corresponding to each sub-problem from the set of subproblems. Further, the subset "R" may be the third subset of routes that may be picked from the set of routes associated with the set of routes associated with each of the set of sub-problems. The size of the subset "R", that may be represented by "r4", may depend on the hardware of the annealer-based solver. Larger the hardware size of the annealer-based solver, more the number of routes that may be included in the subset "R" and faster may be the improvement of the final solution.

At block 1126, an operation to produce a solution "S" for the subset "R" and an operation to add the produced solution "S" to the final solution may be executed. Herein, based on the subset "R", the heuristic-based problem may be constructed, and the solution "S" may be produced, wherein the solution "S" may be indicative of the fourth subset of routes that may be determined using the annealer-based solver 102A. The solution "S", including the fourth set of routes, may be added to the final solution. The operations pertaining to the blocks 1122, 1124, and 1126 may be performed for a large number of times (e.g., a few hundred times) to improve the final solution. Details of the heuristic-based problem and the fourth subset of routes have been provided, for example, in FIG. 9.

At step 1128, an operation to combine solution and the improvement solution into a solution "InitS" may be executed. Herein, the final solution (that may be obtained after combining the intermediate solution associated with each sub-problem of the set of sub-problems) may be combined with the improvement solution to obtain the solution "InitS".

The solution "InitS" may include the set of optimal routes 520, which may correspond to the shortest path that the set of vehicles may take between the depot 114 and the set of warehouses 116A to 116H to transport the set of items such that the total cost involved may be a minimum cost. Also, as the set of optimal routes 520 may correspond to the shortest path, the set of vehicles may require a minimum amount of time to cover the set of optimal routes 520, as compared to the other possible routes. Therefore, use of the set of optimal routes 520 may lead to operational efficiency for the set of vehicles in terms of fuel consumption, fleet management, and logistics costs involved in transportation of the items.

Various embodiments of the disclosure may provide one or more non-transitory computer-readable storage media configured to store instructions that, in response to being executed, cause a system (such as, the example electronic device 102) to perform operations. The operations may include receiving a set of parameters associated with a vehicle routing problem. Herein, the vehicle routing problem may be an optimization problem whose goal may be to determine a set of optimal routes, between a depot and a set of warehouses, for a delivery of a set of items using a set of vehicles, and a total cost associated with the set of optimal routes may correspond to a minimum cost associated with a set of possible routes between the depot and the set of warehouses. The operations may further include receiving a set of decision variables associated with the optimization problem. The operations may further include receiving a set of constraints associated with the optimization problem based on the received set of parameters and the received set of decision variables. The operations may further include constructing the optimization problem based on the received set of constraints. The operations may further include dividing the constructed optimization problem into a set of sub-problems, each of the set of sub-problems corresponds to a subset of warehouses of the set of warehouses. The operations may further include determining, using an annealer-based solver, an intermediate solution for each of the set of sub-problems to determine a set of routes associated with the corresponding sub-problem of the set of sub-problems. The operations may further include combining the intermediate solution associated with each of the set of sub-problems to determine a final solution of the optimization problem based on the received set of constraints. Herein, the determined final solution is indicative of the set of optimal routes to be assigned to the set of vehicles. The operations may further include rendering the determined final solution of the optimization problem on a display device.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, executed by a processor, comprising:
   receiving a set of parameters associated with a vehicle routing problem, wherein
   the vehicle routing problem is an optimization problem whose goal is to determine a set of optimal routes, between a depot and a set of warehouses, for a delivery of a set of items using a set of vehicles, and
   a total cost associated with the set of optimal routes corresponds to a minimum cost associated with a set of possible routes between the depot and the set of warehouses;
   receiving a set of decision variables associated with the optimization problem;
   receiving a set of constraints associated with the optimization problem based on the received set of parameters and the received set of decision variables;
   constructing the optimization problem based on the received set of constraints;
   dividing the constructed optimization problem into a set of sub-problems assigned to different annealer-based solvers, each of the set of sub-problems corresponds to a subset of warehouses of the set of warehouses, complexity of the sub-problems being less than complexity of the optimization problem;
   determining, using the annealer-based solvers, an intermediate solution for each of the set of sub-problems to determine a set of routes associated with the corresponding sub-problem of the set of sub-problems;
   combining the intermediate solution associated with each of the set of sub-problems to determine a final solution of the optimization problem based on the received set of constraints,
   wherein the determined final solution is indicative of the set of optimal routes to be assigned to the set of vehicles;
   rendering the determined final solution of the optimization problem on a display device; and
   performing the constructing, the dividing, the determining, the combining and the rendering to provide the final solution to a new vehicle routing problem in response to variation of the set of constraints.

2. The method according to claim 1, wherein the received set of parameters comprises at least one of: a number of vehicles, a preparation time associated with a vehicle type, a travel time between a first location and a second location, a demand at a location for loading and/or unloading of one or more items, an iterative operation time, an unload deadline for a location, an earliest time to begin loading at a location, a maximum loading time at a location, a cost associated with a vehicle type for an operation time, a binary value indicative of whether a vehicle type can accommodate a predefined amount of one or more items, or a cost of a route.

3. The method according to claim 1, wherein the received set of decision variables comprises at least one of: a binary variable indicative of whether a vehicle type with a predefined operation time is assigned to a route, a time taken to travel from a first location to a second location in a route, a total time taken between two locations, a warehouse visited at a location in a route, an amount of loading or unloading of one or more items at a location in a route, a binary variable indicative of whether a loading or unloading action is performed at a location associated with a warehouse in a route, a binary variable indicative of whether a final loading candidate is complete for a warehouse at a location in a route, a total amount of loading or unloading of one or more items, an amount of loading or unloading of one or more items at a warehouse in a route, or a binary variable indicative of whether a loading at warehouses in a route is done in a time that satisfies a maximum loading time constraint.

4. The method according to claim 1, wherein the received set of constraints comprises: a vehicle type constraint, an action type constraint, a distance validation constraint, a total time constraint, a task and amount matching validation constraint, a route end and stay validation constraint, a disabled route enforcement constraint, a demand constraint, an operation time constraint, a deadline constraint, a maximum load time constraint, a capacity computation constraint, and a vehicle capacity constraint.

5. The method according to claim 1, wherein the optimization problem includes a first objective function configured to minimize a total cost associated with an assignment of a route to a vehicle type for an operation time, for each route in the set of possible routes.

6. The method according to claim 1, wherein the optimization problem includes a second objective function configured to minimize a summation of a total cost associated with each route included in the set of optimal routes.

7. The method according to claim 1, further comprising:
   determining an improved intermediate solution for each of the set of sub-problems, based on an application of a heuristic technique on the determined intermediate solution associated with the corresponding sub-problem of the set of sub-problems,
   wherein the determination of the final solution is further based on a combination of the determined improved intermediate solution for each of the set of sub-problems.

8. The method according to claim 7, further comprising:
   selecting a first subset of routes from the set of routes associated with a sub-problem of the set of sub-problems;

constructing heuristic-based problem based on the selected first subset of routes;
determining, using the annealer-based solver, a solution indicative of a second subset of routes based on the constructed heuristic-based problem;
comparing the determined solution with the intermediate solution associated with the sub-problem; and
selecting the determined solution as the improved intermediate solution based on the comparison,
wherein the set of routes associated with the sub-problem is updated based on the second subset of routes.

9. The method according to claim 1, further comprising:
determining an improved final solution of the optimization problem, based on an application of a heuristic technique on the determined final solution,
wherein the improved final solution corresponds to the set of optimal routes to be assigned to the set of vehicles.

10. The method according to claim 9, further comprising
selecting a third subset of routes from the set of routes associated with the set of routes associated with each of the set of sub-problems;
constructing heuristic-based problem based on the selected third subset of routes;
determining, using the annealer-based solver, a solution indicative of a fourth subset of routes based on the constructed heuristic-based problem;
comparing the determined solution with the final solution; and
selecting the determined solution as the improved final solution based on the comparison,
wherein the set of optimal routes is updated based on the fourth subset of routes.

11. The method according to claim 1, wherein the determination of the final solution is further based on at least one of: the set of routes including the set of warehouses, a satisfaction of the set of constraints, and a minimization of the total cost associated with the set of optimal routes.

12. The method according to claim 1, further comprising:
selecting a first subset of locations from a set of locations associated with a first sub-problem of the set of sub-problems;
controlling an execution of a first set of operations to solve the first sub-problem using the annealer-based solver, wherein the first set of operations includes:
determining a first partial solution associated with the first sub-problem for the selected first subset of locations;
adding the first partial solution to an initial solution associated with the first sub-problem;
re-selecting a second subset of locations from the set of locations, as the selected first subset of locations; and
obtaining the intermediate solution associated with the first sub-problem from the initial solution based on an iterative execution of the first set of operations for a first predetermined number of iterations.

13. The method according to claim 12, further comprising:
selecting a first subset of routes based on the initial solution associated with the first sub-problem;
controlling an execution of a second set of operations to solve the first sub-problem using the annealer-based solver, wherein the second set of operations includes:
determining a second partial solution associated with the first sub-problem for the selected first subset of routes;
adding the second partial solution to the initial solution associated with the first sub-problem;
re-selecting a second subset of routes based on the initial solution, as the selected first subset of routes; and
obtaining the intermediate solution associated with the first sub-problem from the initial solution further based on an iterative execution of the second set of operations for a second predetermined number of iterations.

14. One or more non-transitory computer-readable storage media configured to store instructions that, in response to being executed, cause an electronic device to perform operations, the operations comprising:
receiving a set of parameters associated with a vehicle routing problem, wherein
the vehicle routing problem is an optimization problem whose goal is to determine a set of optimal routes, between a depot and a set of warehouses, for a delivery of a set of items using a set of vehicles, and
a total cost associated with the set of optimal routes corresponds to a minimum cost associated with a set of possible routes between the depot and the set of warehouses;
receiving a set of decision variables associated with the optimization problem;
receiving a set of constraints associated with the optimization problem based on the received set of parameters and the received set of decision variables;
constructing the optimization problem based on the received set of constraints;
dividing the constructed optimization problem into a set of sub-problems assigned to different annealer-based solvers, each of the set of sub-problems corresponds to a subset of warehouses of the set of warehouses, complexity of the sub-problems being less than complexity of the optimization problem;
determining, using the annealer-based solvers, an intermediate solution for each of the set of sub-problems to determine a set of routes associated with the corresponding sub-problem of the set of sub-problems;
combining the intermediate solution associated with each of the set of sub-problems to determine a final solution of the optimization problem based on the received set of constraints,
wherein the determined final solution is indicative of the set of optimal routes to be assigned to the set of vehicles;
rendering the determined final solution of the optimization problem on a display device; and
performing the constructing, the dividing, the determining, the combining and the rendering to provide the final solution to a new vehicle routing problem in response to variation of the set of constraints.

15. The one or more non-transitory computer-readable storage media according to claim 14, wherein the received set of parameters comprises at least one of: a number of vehicles, a preparation time associated with a vehicle type, a travel time between a first location and a second location, a demand at a location for loading and/or unloading of one or more items, an iterative operation time, an unload deadline for a location, an earliest time to begin loading at a location, a maximum loading time at a location, a cost associated with a vehicle type for an operation time, a binary value indicative of whether a vehicle type can accommodate a predefined amount of one or more items, or a cost of a route.

16. The one or more non-transitory computer-readable storage media according to claim 14, wherein the received set of decision variables comprises at least one of: a binary variable indicative of whether a vehicle type with a predefined operation time is assigned to a route, a time taken to travel from a first location to a second location in a route, a total time taken between two locations, a warehouse visited at a location in a route, an amount of loading or unloading of one or more items at a location in a route, a binary variable indicative of whether a loading or unloading action is performed at a location associated with a warehouse in a route, a binary variable indicative of whether a final loading candidate is complete for a warehouse at a location in a route, a total amount of loading or unloading of one or more items, an amount of loading or unloading of one or more items at a warehouse in a route, or a binary variable indicative of whether a loading at warehouses in a route is done in a time that satisfies a maximum loading time constraint.

17. The one or more non-transitory computer-readable storage media according to claim 14, wherein the received set of constraints comprises: a vehicle type constraint, an action type constraint, a distance validation constraint, a total time constraint, a task and amount matching validation constraint, a route end and stay validation constraint, a disabled route enforcement constraint, a demand constraint, an operation time constraint, a deadline constraint, a maximum load time constraint, a capacity computation constraint, and a vehicle capacity constraint.

18. The one or more non-transitory computer-readable storage media according to claim 14, wherein the operations further comprise:
 determining an improved intermediate solution for each of the set of sub-problems, based on an application of a heuristic technique on the determined intermediate solution associated with the corresponding sub-problem of the set of sub-problems,
 wherein the determination of the final solution is further based on a combination of the determined improved intermediate solution for each of the set of sub-problems.

19. The one or more non-transitory computer-readable storage media according to claim 18, wherein the operations further comprise:
 selecting a first subset of routes from the set of routes associated with a sub-problem of the set of sub-problems;
 constructing heuristic-based problem based on the selected first subset of routes;
 determining, using the annealer-based solver, a solution indicative of a second subset of routes based on the constructed heuristic-based problem;
 comparing the determined solution with the intermediate solution associated with the sub-problem; and
 selecting the determined solution as the improved intermediate solution based on the comparison,
 wherein the set of routes associated with the sub-problems is updated based on the second subset of routes.

20. An electronic device, comprising:
 a memory storing instructions; and
 a processor, coupled to the memory, that executes the instructions to perform a process comprising:
 receiving a set of parameters associated with a vehicle routing problem, wherein
 the vehicle routing problem is an optimization problem whose goal is to determine a set of optimal routes, between a depot and a set of warehouses, for a delivery of a set of items using a set of vehicles, and
 a total cost associated with the set of optimal routes corresponds to a minimum cost associated with a set of possible routes between the depot and the set of warehouses;
 receiving a set of decision variables associated with the optimization problem;
 receiving a set of constraints associated with the optimization problem based on the received set of parameters and the received set of decision variables;
 constructing the optimization problem based on the received set of constraints;
 dividing the constructed optimization problem into a set of sub-problems assigned to different annealer-based solvers, each of the set of sub-problems corresponds to a subset of warehouses of the set of warehouses, complexity of the sub-problems being less than complexity of the optimization problem;
 determining, using the annealer-based solvers, an intermediate solution for each of the set of sub-problems to determine a set of routes associated with the corresponding sub-problem of the set of sub-problems;
 combining the intermediate solution associated with each of the set of sub-problems to determine a final solution of the optimization problem based on the received set of constraints,
 wherein the determined final solution is indicative of the set of optimal routes to be assigned to the set of vehicles;
 rendering the determined final solution of the optimization problem on a display device; and
 performing the constructing, the dividing, the determining, the combining and the rendering to provide the final solution to a new vehicle routing problem in response to variation of the set of constraints.

* * * * *